(12) United States Patent
Lokare et al.

(10) Patent No.: US 10,565,528 B2
(45) Date of Patent: Feb. 18, 2020

(54) ANALYTIC SYSTEM FOR FEATURE ENGINEERING IMPROVEMENT TO MACHINE LEARNING MODELS

(71) Applicant: SAS Institute Inc., Cary, NC (US)

(72) Inventors: Namita Dilip Lokare, Cary, NC (US); Jorge Manuel Gomes da Silva, Durham, NC (US); Ilknur Kaynar Kabul, Apex, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 16/221,937

(22) Filed: Dec. 17, 2018

(65) Prior Publication Data

US 2019/0251467 A1      Aug. 15, 2019

Related U.S. Application Data

(60) Provisional application No. 62/633,938, filed on Feb. 22, 2018, provisional application No. 62/628,662, filed on Feb. 9, 2018.

(51) Int. Cl.
*G06N 20/00* (2019.01)
*G06F 17/16* (2006.01)

(52) U.S. Cl.
CPC .............. *G06N 20/00* (2019.01); *G06F 17/16* (2013.01)

(58) Field of Classification Search
CPC .......... G06N 20/00; G06N 7/005; G06N 3/03; G06F 17/16
USPC ........................................................ 706/20
See application file for complete search history.

(56) References Cited

U.S. PATENT DOCUMENTS

| 2010/0189320 A1* | 7/2010 | Dewaele ................. G06T 7/168 382/128 |
| 2016/0242690 A1* | 8/2016 | Principe ................. A61B 5/742 |
| 2016/0247089 A1* | 8/2016 | Zhao ....................... G06N 20/00 |

OTHER PUBLICATIONS

Kerry Patterson, An Introduction to ARMA Models. In: Unit Root Tests in Time Series, ARMA Models, Chapter 3, Palgrave Texts in Econometrics. Palgrave Macmillan, London , 2011, pp. 83-108.
Brockwell et al., Time Series: Theory and Methods, chapter 3, New York: Springer-Verlag, 1987, 1987, pp. 83-108.
(Continued)

*Primary Examiner* — Dave Misir
(74) *Attorney, Agent, or Firm* — Bell & Manning, LLC

(57) ABSTRACT

A computing device determines a sparse feature representation for a machine learning model. Landmark observation vectors are randomly selected. Neighbor observation vectors are randomly selected that are less than a predefined distance from a selected landmark observation vector. The observation vectors are projected into a neighborhood subspace defined by principal components computed for the neighbor observation vectors. A distance vector includes a distance value computed between each landmark observation vector and each observation vector of the projected observation vectors. Nearest landmark observation vectors are selected from the landmark observation vectors for each observation vector. A second distance vector that includes a second distance value computed between each observation vector and each landmark observation vector is added to a feature distance matrix, where the second distance value is zero for each landmark observation vector not included in the nearest landmark observation vectors. A model is trained using the feature distance matrix.

30 Claims, 25 Drawing Sheets
(8 of 25 Drawing Sheet(s) Filed in Color)

(56) References Cited

OTHER PUBLICATIONS

I.T. Jolliffe, Principal Component Analysis, Chapter 7, Spring-Verlag 2nd ed., 2002, pp. 150-165.

Lokare et al, RULLS: Randomized Union of Locally Linear Subspaces for Feature Engineering, KDD'2018, Feb. 2018, pp. i-ix.

Lu et al, A Theory for Sampling Signals from a Union of Subspaces, IEEE Transactions of Signal Processing, vol. 56, No. 6, Jun. 2008, pp. 2334-2345.

Wang et al, Randomized Feature Engineering as a Fast and Accurate Alternative to Kernel Methods, KDD'17, Aug. 13-17, 2017, Halifax, NS, Canada, Aug. 13, 2017, pp. 485-494.

Xiao et al, Fashion-MNIST: a Novel Image Dataset for Benchmarking Machine Learning Algorithms, arXiv:1708.07747v2, Sep. 15, 2017, pp. 1-6.

SAS, SAS/STAT 14.1 User's Guide High-Performance Procedures, SAS Institute Inc., Jul. 2015, pp. 99 pages.

SAS, SAS® Visual Data Mining and Machine Learning 8.2 Programming Guide, SAS Institute Inc., Dec. 2017, pp. 178 pages.

Hubert et al., ROBPCA: A New Approach to Robust Principal Component Analysis, Technometrics 47:1, Feb. 2005, pp. 64-79.

SAS, SAS/STAT® 14.1 User's Guide the PRINCOMP Procedure, SAS Institute, Inc., Jul. 2015, pp. 49 pages.

I.T. Jolliffe, Principal Component Analysis, Ch. 6, Springer-Verlag 2nd ed, 2003, pp. 111-114.

Principal Component Analysis and Factor Analysis. In: Principal Component Analysis Chapter 7, Springer Series in Statistics. Springer, New York, NY , 2002, pp. 150-166.

SAS, SAS Enterprise Miner 14.2 High-Performance Procedures, SAS Institute Inc., Nov. 16, 2016, pp. 35 pages.

SAS, SAS Visual Data Mining and Machine Learning 8.1 Data Mining and Machine Learning Procedures, SAS Institute Inc., Mar. 2017, pp. 118 pages.

\* cited by examiner

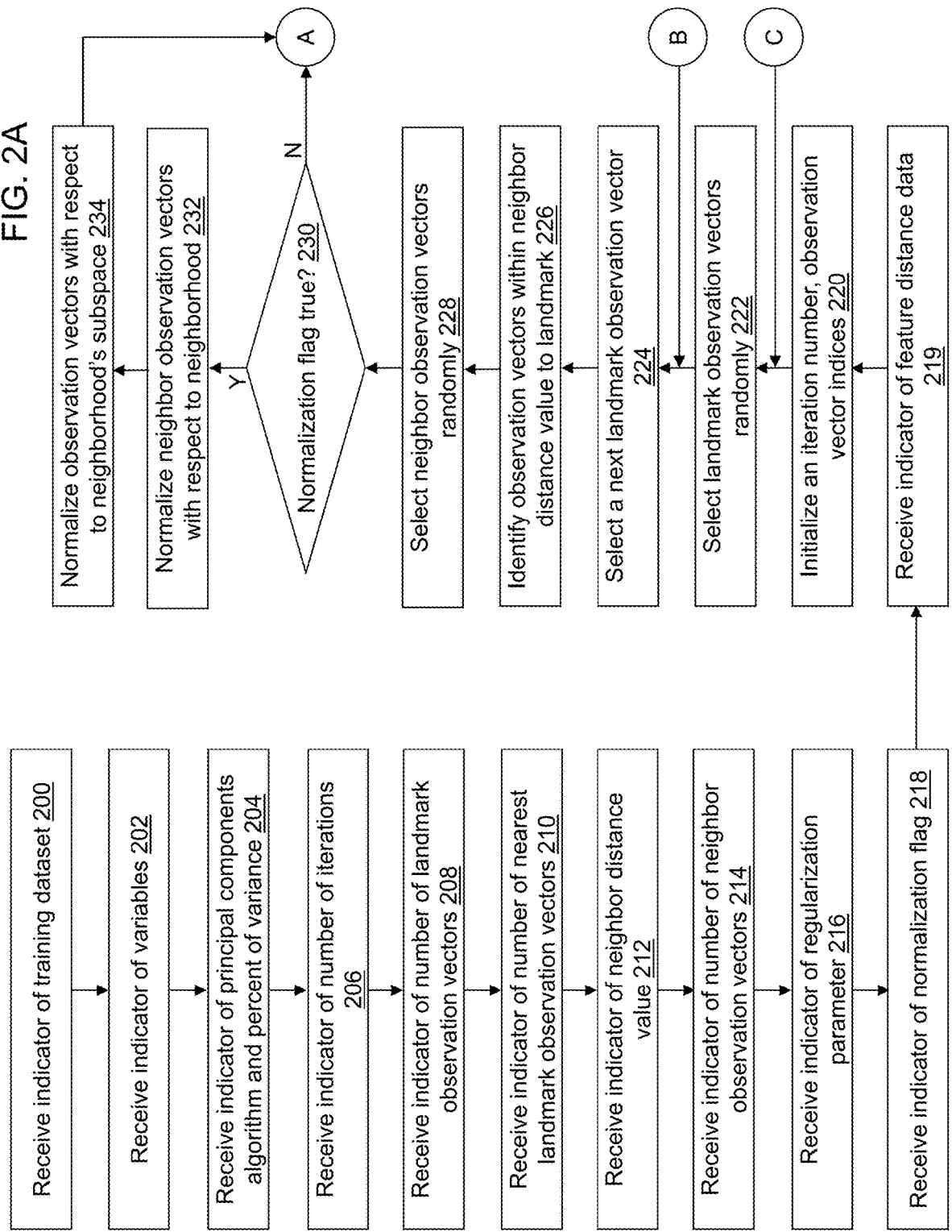

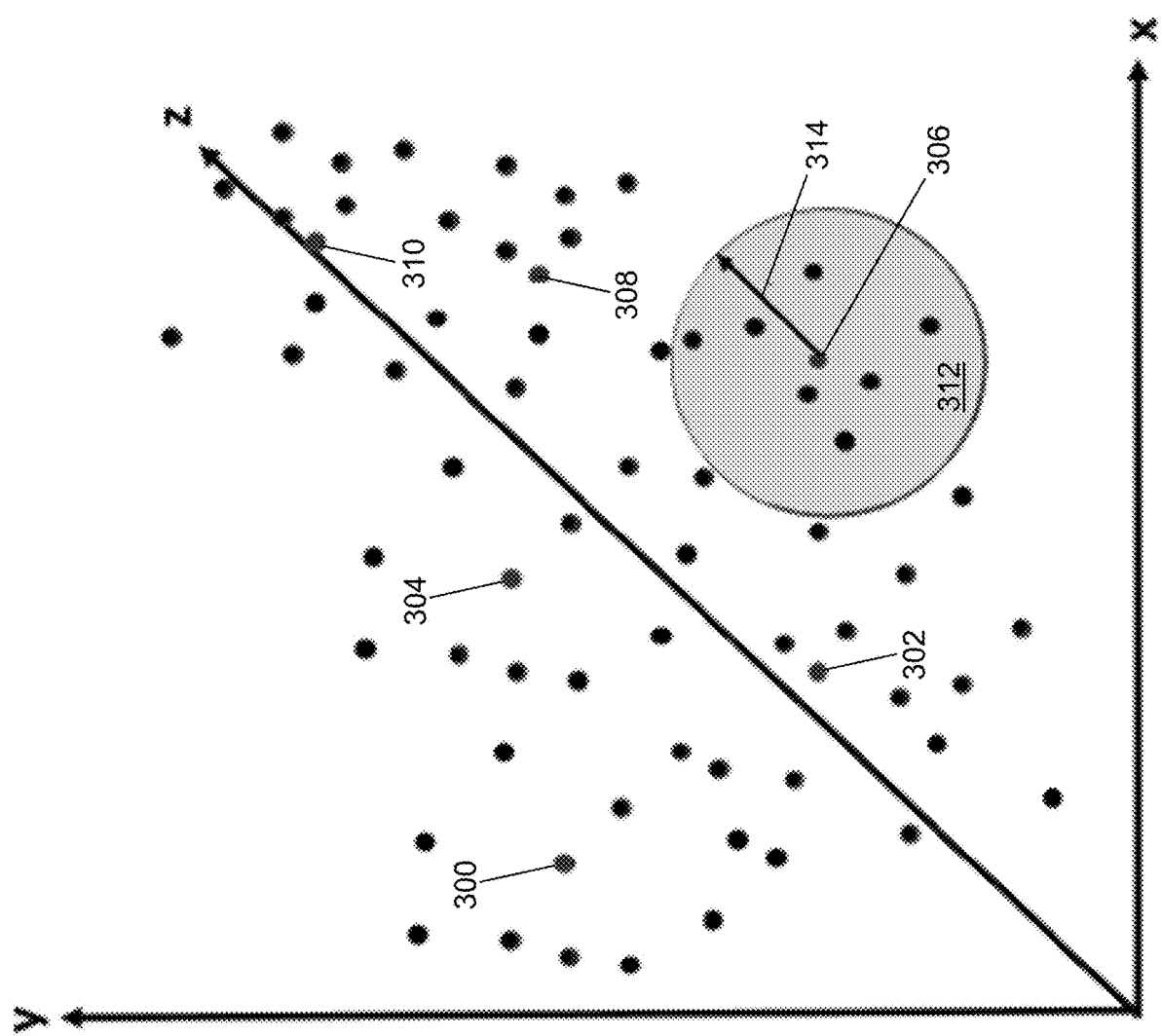

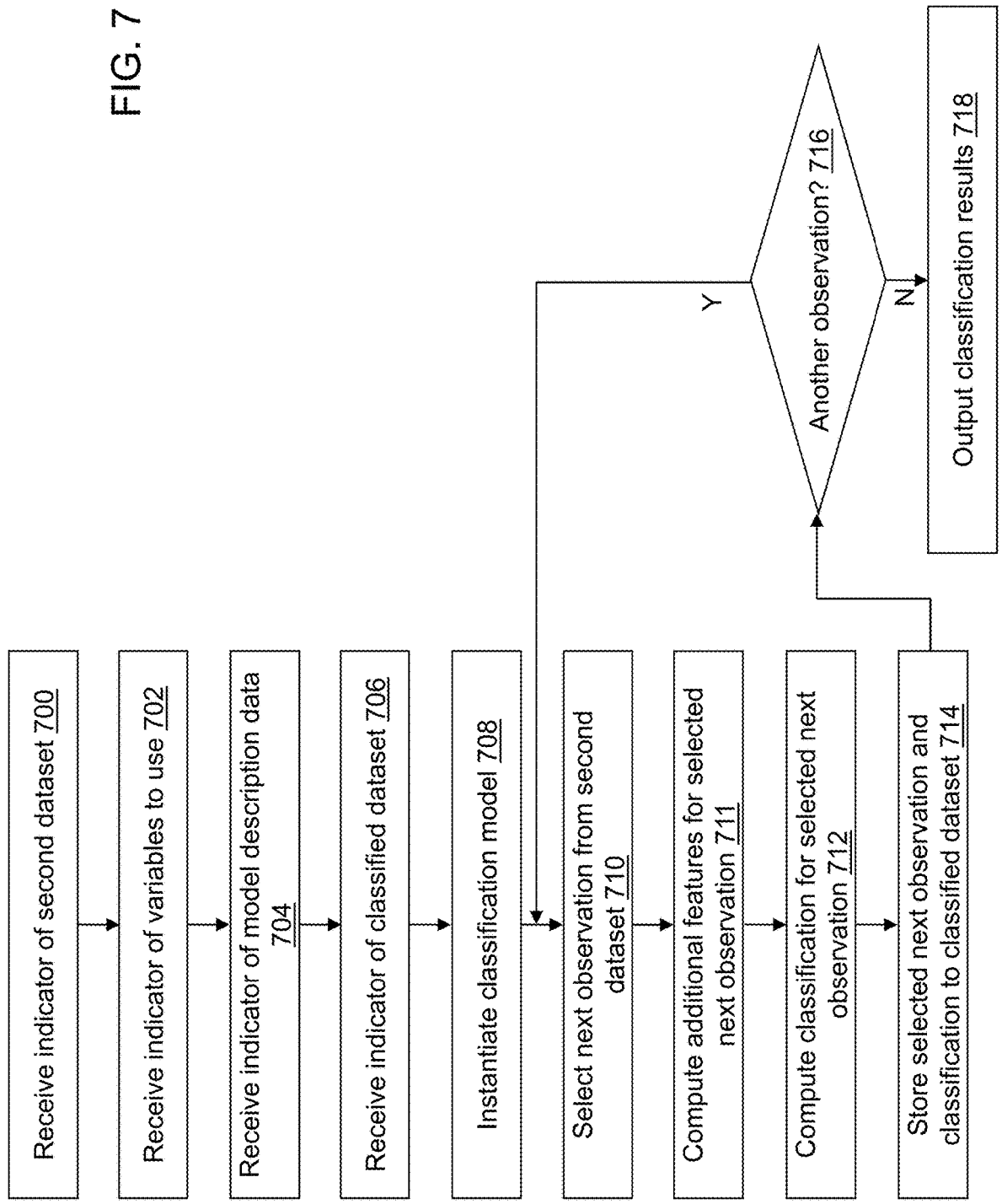

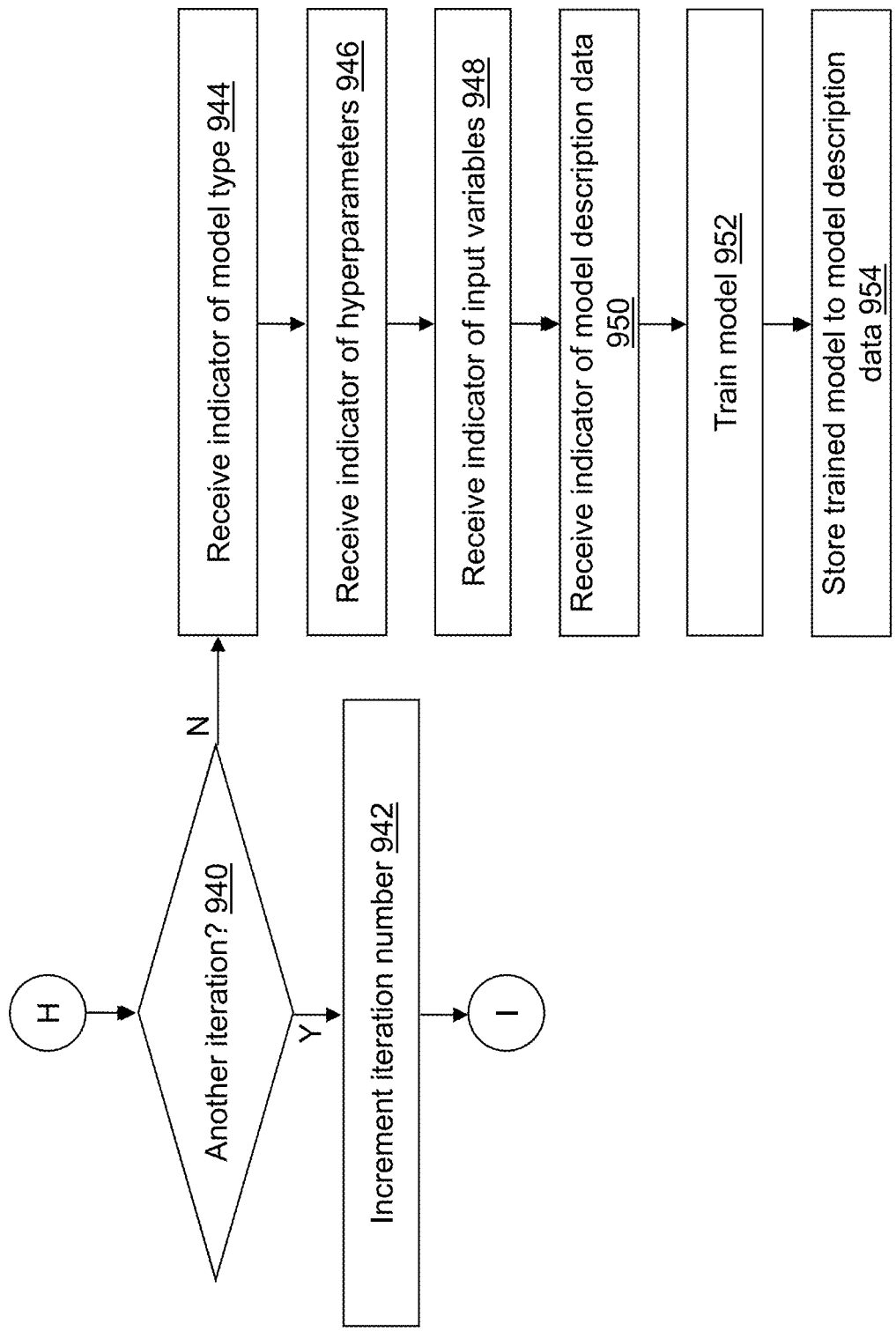

| Method | Japanese Vowel | Fashion MNIST | Breast Cancer | Baseball | Digits |
|---|---|---|---|---|---|
| Raw Features | 89.18 | 78.06 | 88.72 | 89.45 | 90.25 |
| RandLocal | 89.29 | 76.43 | 91.92 | 92.16 | 95.38 |
| Variant I | 92.92 | 83.19 | 92.79 | 92.09 | 97.00 |
| Variant II | 92.76 | 82.96 | 92.70 | 92.53 | 97.17 |
| RULLS (PCA) | 98.02 | 85.54 | 92.80 | 92.73 | 97.66 |

| Method | Add noise to columns (10%) | | | | Add noise to rows (10%) | | | |
|---|---|---|---|---|---|---|---|---|
| | Japanese Vowel | Fashion MNIST | Breast Cancer | Baseball | Japanese Vowel | Fashion MNIST | Breast Cancer | Baseball |
| Raw Features | 87.90 (1.28) | 77.79 (0.27) | 80.57 (8.15) | 90.30 (0.85) | 67.53 (21.65) | 79.06 (1.00) | 84.36 (4.36) | 88.81 (0.64) |
| RandLocal | 84.91 (4.38) | 74.65 (1.78) | 86.78 (5.14) | 91.76 (0.40) | 81.87 (7.42) | 76.46 (0.03) | 90.70 (1.22) | 91.41 (0.75) |
| Variant I | 91.16 (1.76) | 82.04 (1.15) | 86.96 (3.83) | 91.34 (0.75) | 85.04 (7.88) | 82.74 (0.45) | 91.39 (1.40) | 91.56 (0.53) |
| Variant II | 91.28 (1.48) | 81.85 (1.11) | 89.64 (3.06) | 91.27 (1.26) | 84.80 (7.96) | 82.82 (0.14) | 92.45 (0.23) | 91.33 (1.20) |
| RULLS (PCA) | 91.76 (6.26) | 84.06 (1.48) | 88.07 (4.73) | 91.79 (0.94) | 89.61 (8.41) | 85.55 (0.01) | 90.17 (2.63) | 91.86 (0.87) |

FIG. 16

| Breast Cancer | Raw features | Columns (10%) | Rows (10%) |
|---|---|---|---|
| RULLS (ROBPCA) | 92.28 | 86.49 | 93.33 |

FIG. 17

ANALYTIC SYSTEM FOR FEATURE ENGINEERING IMPROVEMENT TO MACHINE LEARNING MODELS

CROSS-REFERENCE TO RELATED APPLICATIONS

The present application claims the benefit of 35 U.S.C. § 111(e) to U.S. Provisional Patent Application No. 62/628,662 filed on Feb. 9, 2018, and to U.S. Provisional Patent Application No. 62/633,938 filed on Feb. 22, 2018, the entire contents of which are hereby incorporated by reference.

BACKGROUND

Feature engineering plays an important role in the success of a machine learning model. Most of the effort in training a model goes into data preparation and choosing the right features to represent the data. Often, features in the original data are not optimal and feature engineering is required to learn a good representation as an input to machine learning models. Recent advancements in domain specific feature engineering methods in areas of text mining, speech recognition, and emotion recognition have shown promising results. Analyzing high-dimensional datasets, however, can be challenging and computationally expensive. Moreover, such datasets often include features that are irrelevant to the task at hand.

SUMMARY

In an example embodiment, a non-transitory computer-readable medium is provided having stored thereon computer-readable instructions that, when executed by a computing device, cause the computing device to determine a feature representation for a machine learning model to support model improvement. A dataset is read that includes a plurality of observation vectors. Each observation vector of the plurality of observation vectors includes a plurality of variable values. Each variable value is associated with a variable of a plurality of variables. (a) A plurality of landmark observation vectors is randomly selected from the plurality of observation vectors. A predefined number of landmark observation vectors is randomly selected. (b) A landmark observation vector is selected from the selected plurality of landmark observation vectors. (c) A plurality of neighbor observation vectors is randomly selected that are less than a predefined distance from the selected landmark observation vector. A predefined number of neighbor observation vectors is randomly selected. (d) A plurality of principal components is computed for the selected plurality of neighbor observation vectors to define a neighborhood subspace. (e) The plurality of observation vectors is projected into the defined neighborhood subspace. (f) A distance vector is computed that includes a distance value computed between the selected landmark observation vector and each observation vector of the projected plurality of observation vectors. (g) The computed distance vector is added to a distance matrix. (h) (c) to (g) are repeated with a next landmark observation vector selected from the selected plurality of landmark observation vectors as the selected landmark observation vector until each of the predefined number of landmark observation vectors is selected. (i) An observation vector is selected from the plurality of observation vectors. (j) A plurality of nearest landmark observation vectors is selected from the selected plurality of landmark observation vectors for the selected observation vector. A predefined number of the plurality of nearest landmark observation vectors is selected based on minimum distances identified in the distance matrix for the selected observation vector. (k) A second distance vector is computed that includes a second distance value computed between the selected observation vector and each landmark observation vector. The second distance value is zero for each landmark observation vector not included in the selected plurality of nearest landmark observation vectors. (l) the computed second distance vector is added to a feature distance matrix. (m) (j) to (l) are repeated with a next observation vector selected from the plurality of observation vectors as the selected observation vector until each observation vector of the plurality of observation vectors is selected. A model is trained using the feature distance matrix. The trained model is stored for classifying a second observation vector included in a second dataset.

In another example embodiment, a computing device is provided. The computing device includes, but is not limited to, a processor and a non-transitory computer-readable medium operably coupled to the processor. The computer-readable medium has instructions stored thereon that, when executed by the computing device, cause the computing device to determine a feature representation for a machine learning model to support model improvement.

In yet another example embodiment, a method determines a feature representation for a machine learning model to support model improvement.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements. The patent or application file contains at least one drawing executed in color. Copies of this patent or patent application publication with color drawing(s) will be provided by the Office upon request and payment of the necessary fee.

FIGS. 2A, 2B, and 2C depict a flow diagram illustrating examples of operations performed by a feature generation application of the feature generation device of FIG. 1 in accordance with an illustrative embodiment.

FIG. 3 shows a landmark and a neighbor observation vector selection by the feature generation application of FIGS. 2A, 2B, and 2C in accordance with an illustrative embodiment.

FIG. 7 depicts a flow diagram illustrating examples of operations performed by a classification application of the classification device of FIG. 6 in accordance with an illustrative embodiment.

FIGS. 9A and 9B depict a flow diagram illustrating examples of operations performed by a third feature generation application of the feature generation device of FIG. 1 in accordance with an illustrative embodiment.

FIG. 16 provides a second accuracy comparison table in accordance with an illustrative embodiment.

FIG. 17 provides a third accuracy comparison table in accordance with an illustrative embodiment.

DETAILED DESCRIPTION

Selecting features appropriately reduces dimensionality and correlation between the features thus improving machine learning model performance. Several techniques have been developed to reduce the dimensions (features) of the input data. Dimension reduction techniques are broadly classified as linear and nonlinear. Linear dimension reduction techniques assume that the data points lie close to a linear (affine) subspace in the input space. Such methods globally transform the data by rotation, translation, and/or scaling. Non-linear dimension reduction techniques, sometimes referred to as manifold learning approaches, often assume that input data lies along a low dimensional manifold embedded in a high dimensional space.

Figure 1:
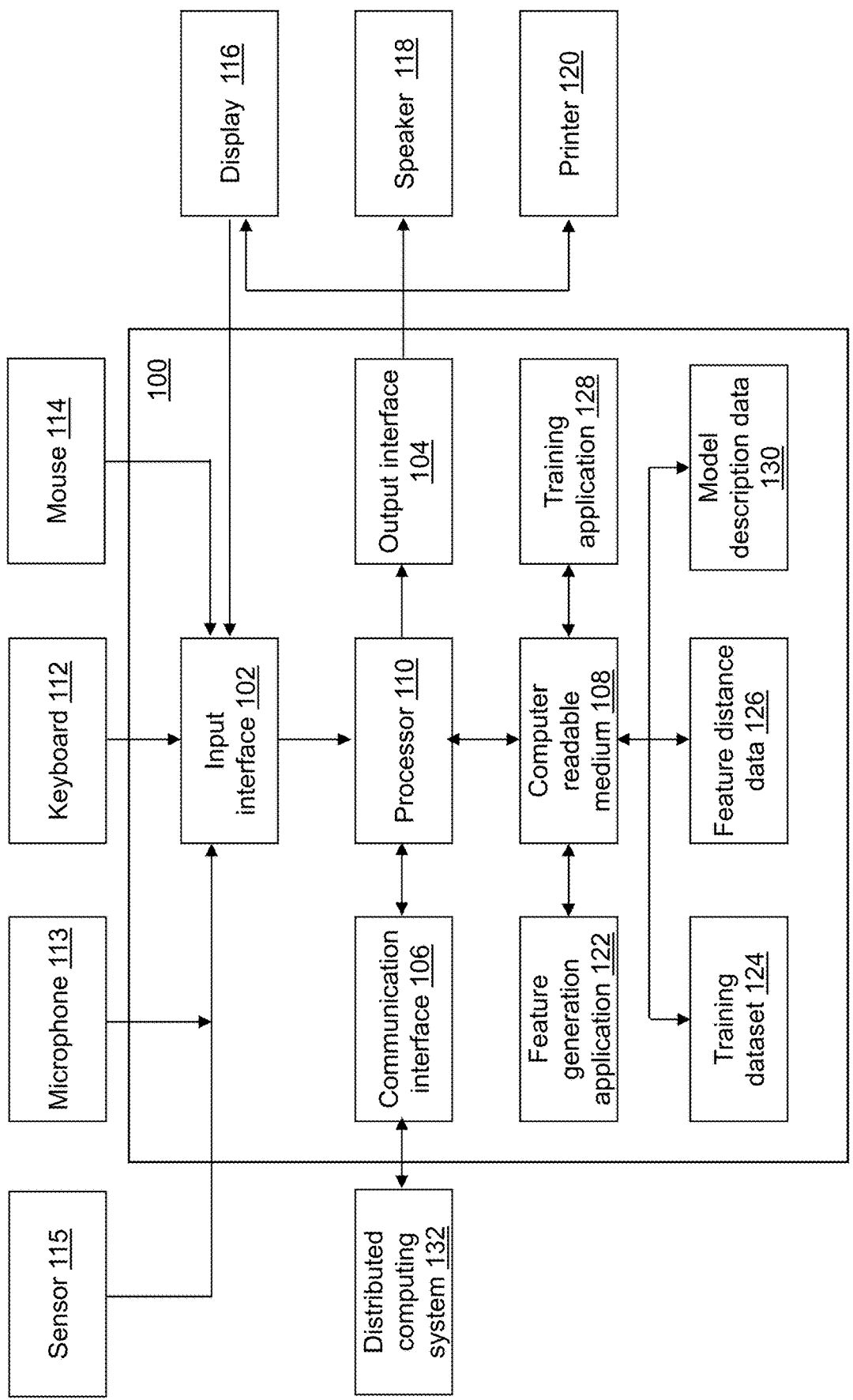
FIG. 1 depicts a block diagram of a feature generation device in accordance with an illustrative embodiment.

Referring to FIG. 1, a block diagram of a feature generation device 100 is shown in accordance with an illustrative embodiment. Feature generation device 100 defines a feature matrix used to train a model to improve performance of the trained model. Feature generation device 100 may include an input interface 102, an output interface 104, a communication interface 106, a non-transitory computer-readable medium 108, a processor 110, a feature generation application 122, a training dataset 124, a feature distance data 126, a training application 128, and a model description data 130. Fewer, different, and/or additional components may be incorporated into feature generation device 100.

Feature generation application 122 provides a robust feature engineering method that uses a piecewise-linear model defined by a randomized union of subspaces, which handles non-linearly distributed data via locally linear approximations. Feature generation application 122 generates sparse, non-negative, and rotation invariant features in an unsupervised fashion. Feature generation application 122 aggregates features from the random union of subspaces by describing each point using globally chosen landmarks that serve as anchor points for choosing subspaces and selects features that are relevant in a neighborhood around these chosen landmarks. Distances from each data point to a predefined number of nearest landmarks is encoded in the feature matrix that is a union of features from all of the chosen subspaces.

The effectiveness of feature generation application 122 is shown and described below using five different real-world datasets used to define classification models with different defined features even in the presence of noise. Feature generation application 122 is compared with an existing feature generation method and two variants of feature generation application 122. The results show excellent performance using feature generation application 122 for both classification and clustering model tasks, which has application in many different industries and technical areas.

Input interface 102 provides an interface for receiving information from the user or another device for entry into feature generation device 100 as understood by those skilled in the art. Input interface 102 may interface with various input technologies including, but not limited to, a keyboard 112, a microphone 113, a mouse 114, a sensor 115, a display 116, a track ball, a keypad, one or more buttons, etc. to allow the user or another device to enter information into feature generation device 100 or to make selections presented in a user interface displayed on display 116.

The same interface may support both input interface 102 and output interface 104. For example, display 116 comprising a touch screen provides a mechanism for user input and for presentation of output to the user. Feature generation device 100 may have one or more input interfaces that use the same or a different input interface technology. The input interface technology further may be accessible by feature generation device 100 through communication interface 106.

Output interface 104 provides an interface for outputting information for review by a user of feature generation device 100 and/or for use by another application or device. For example, output interface 104 may interface with various output technologies including, but not limited to, display 116, a speaker 118, a printer 120, etc. Feature generation device 100 may have one or more output interfaces that use the same or a different output interface technology. The output interface technology further may be accessible by feature generation device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Feature generation device 100 may have one or more communication interfaces that use the same or a different communication interface technology. For example, feature generation device 100 may support communication using an Ethernet port, a Bluetooth antenna, a telephone jack, a USB port, etc. Data and messages may be transferred between feature generation device 100 and another computing device of distributed computing system 132 using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. feature generation device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Feature generation device 100 also may have one or more drives that support the loading of a memory media such as a CD, DVD, an external hard drive, etc. One or more external hard drives further may be connected to feature generation device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc.

Some processors may be central processing units (CPUs). Some processes may be more efficiently and speedily executed and processed with machine-learning specific processors (e.g., not a generic CPU). Such processors may also provide additional energy savings when compared to generic CPUs. For example, some of these processors can include a graphical processing unit, an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional energy efficiencies, processing speed improvements, data communication speed improvements, and/or data efficiency response variables and improvements throughout various parts of the system.

Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Feature generation device 100 may include a plurality of processors that use the same or a different processing technology.

Feature generation application 122 performs operations associated with defining feature distance data 126 from data stored in training dataset 124 and with defining model description data 130 from data stored in feature distance data 126 and/or in training dataset 124 using training application 128. Model description data 130 may be used to classify an observation in a second dataset 624 (shown referring to FIG. 6) that are stored in classified dataset 626 (shown referring to FIG. 6). Some or all of the operations described herein may be embodied in feature generation application 122. The operations may be implemented using hardware, firmware, software, or any combination of these methods.

Referring to the example embodiment of FIG. 1, feature generation application 122 is implemented in software (comprised of computer-readable and/or computer-executable instructions) stored in computer-readable medium 108 and accessible by processor 110 for execution of the instructions that embody the operations of feature generation application 122. Feature generation application 122 may be written using one or more programming languages, assembly languages, scripting languages, etc. Feature generation application 122 may be integrated with other analytic tools. As an example, feature generation application 122 may be part of an integrated data analytics software application and/or software architecture such as that offered by SAS Institute Inc. of Cary, N.C., USA. Merely for illustration, feature generation application 122 may be implemented using or integrated with one or more SAS software tools such as JMP®, Base SAS, SAS® Enterprise Miner™, SAS/STAT®, SAS® High Performance Analytics Server, SAS® Visual Data Mining and Machine Learning, SAS® LASR™, SAS® In-Database Products, SAS® Scalable Performance Data Engine, SAS® Cloud Analytic Services, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, and SAS/IML® all of which are developed and provided by SAS Institute Inc. of Cary, N.C., USA. Data mining, statistical analytics, and observation classification are applicable in a wide variety of industries to solve technical problems.

Feature generation application 122 may be implemented as a Web application. For example, feature generation application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Training dataset 124 may include, for example, a plurality of rows and a plurality of columns. The plurality of rows may be referred to as observation vectors or records (observations), and the columns may be referred to as variables. Each variable further may be referred to as a feature or a dimension. In an alternative embodiment, training dataset 124 may be transposed. A value may be defined for each variable of the plurality of variables to define an observation vector $x_i$. One or more variables of the plurality of variables may describe a characteristic of a physical object. For example, if training dataset 124 includes data related to operation of a vehicle, the variables may include an oil pressure, a speed, a gear indicator, a gas tank level, a tire pressure for each tire, an engine temperature, a radiator level, etc. Training dataset 124 may include data captured as a function of time for one or more physical objects.

The data stored in training dataset 124 may be generated by and/or captured from a variety of sources including one or more sensors of the same or different type, one or more computing devices, etc. The data stored in training dataset 124 may be received directly or indirectly from the source and may or may not be pre-processed in some manner. For example, the data may be pre-processed using an event stream processor such as the SAS® Event Stream Processing Engine (ESPE), developed and provided by SAS Institute Inc. of Cary, N.C., USA. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observation vectors (rows) and variables (columns) that can be processed by one or more SAS software tools.

In data science, engineering, and statistical applications, data often consists of multiple measurements (across sensors, characteristics, responses, etc.) collected across multiple time instances (patients, test subjects, etc.). These measurements may be collected in training dataset 124 for analysis and processing.

Training dataset 124 may be stored on computer-readable medium 108 or on one or more computer-readable media of distributed computing system 132 and accessed by feature generation device 100 using communication interface 106, input interface 102, and/or output interface 104. Data stored in training dataset 124 may be sensor measurements or signal values captured by a sensor, may be generated or captured in response to occurrence of an event or a transaction, generated by a device such as in response to an interaction by a user with the device, etc. The data stored in training dataset 124 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in training dataset 124 may be captured at different time points periodically, intermittently, when an event occurs, etc. One or more columns of training dataset 124 may include a time and/or date value.

Training dataset 124 may include data captured under normal operating conditions of the physical object. Training dataset 124 may include data captured at a high data rate such as 200 or more observation vectors per second for one or more physical objects. For example, data stored in training dataset 124 may be generated as part of the Internet of Things (IoT), where things (e.g., machines, devices, phones, sensors) can be connected to networks and the data from these things collected and processed within the things and/or external to the things before being stored in training dataset 124. For example, the IoT can include sensors in many different devices and types of devices, and high value analytics can be applied to identify hidden relationships and drive increased efficiencies. This can apply to both big data analytics and real-time analytics. Some of these devices may be referred to as edge devices, and may involve edge computing circuitry. These devices may provide a variety of stored or generated data, such as network data or data specific to the network devices themselves. Again, some data may be processed with an ESPE, which may reside in the cloud or in an edge device before being stored in training dataset 124.

Training dataset 124 may be stored using various data structures as known to those skilled in the art including one or more files of a file system, a relational database, one or more tables of a system of tables, a structured query language database, etc. on feature generation device 100 or on distributed computing system 132. Feature generation device 100 may coordinate access to training dataset 124 that is distributed across distributed computing system 132 that may include one or more computing devices. For example, training dataset 124 may be stored in a cube distributed across a grid of computers as understood by a person of skill in the art. As another example, training dataset 124 may be stored in a multi-node Hadoop® cluster. For instance, Apache™ Hadoop® is an open-source software framework for distributed computing supported by the Apache Software Foundation. As another example, training dataset 124 may be stored in a cloud of computers and accessed using cloud computing technologies, as understood by a person of skill in the art. The SAS® LASR™ Analytic Server may be used as an analytic platform to enable multiple users to concurrently access data stored in training dataset 124. The SAS® Viya™ open, cloud-ready, in-memory architecture also may be used as an analytic platform to enable multiple users to concurrently access data stored in training dataset 124. SAS® Cloud Analytic Services (CAS) may be used as an analytic server with associated cloud services in SAS® Viya™ Some systems may use SAS In-Memory Statistics for Hadoop® to read big data once and analyze it several times by persisting it in-memory for the entire session. Some systems may be of other types and configurations.

Figure 2B:
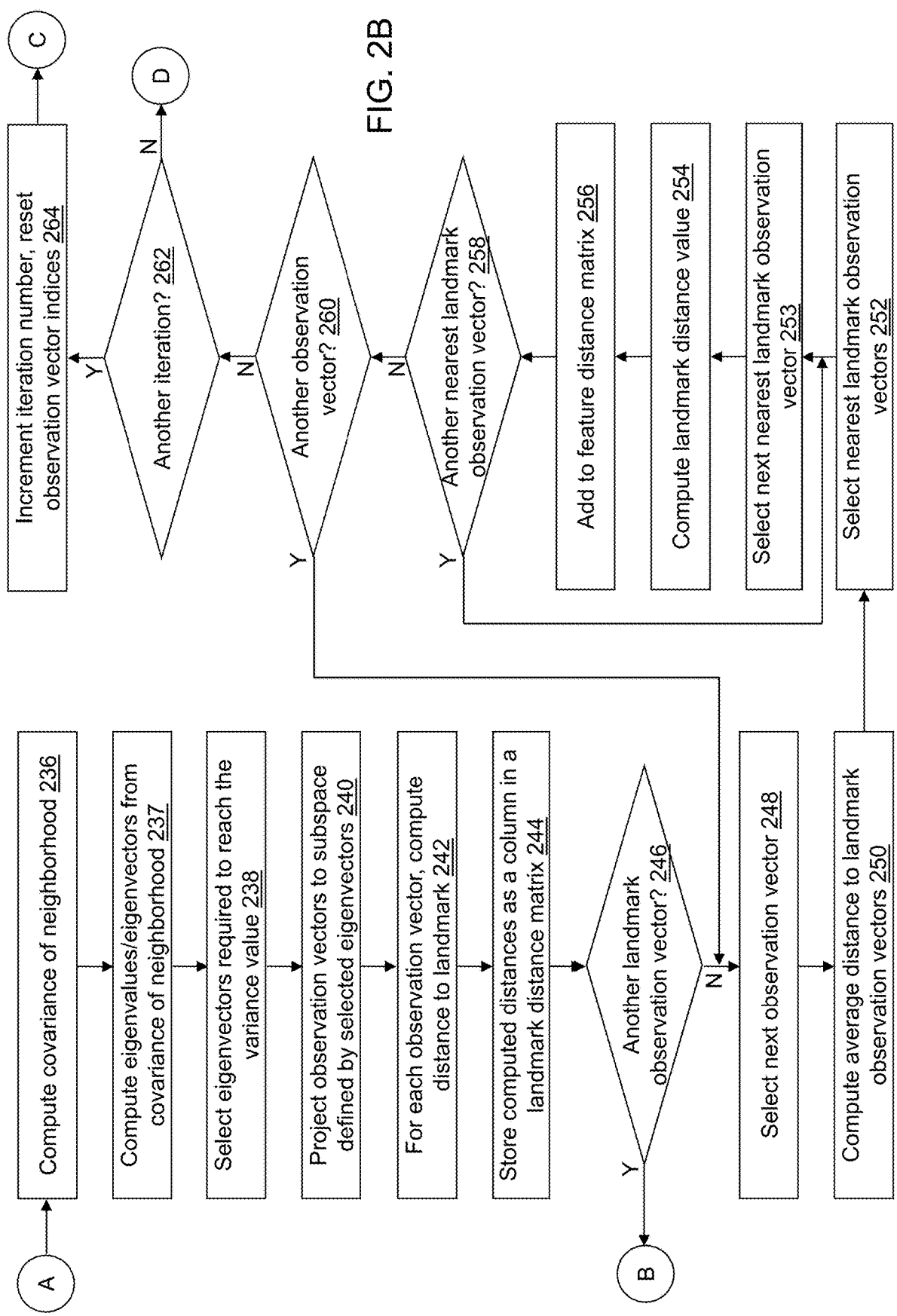
Figure 2C:
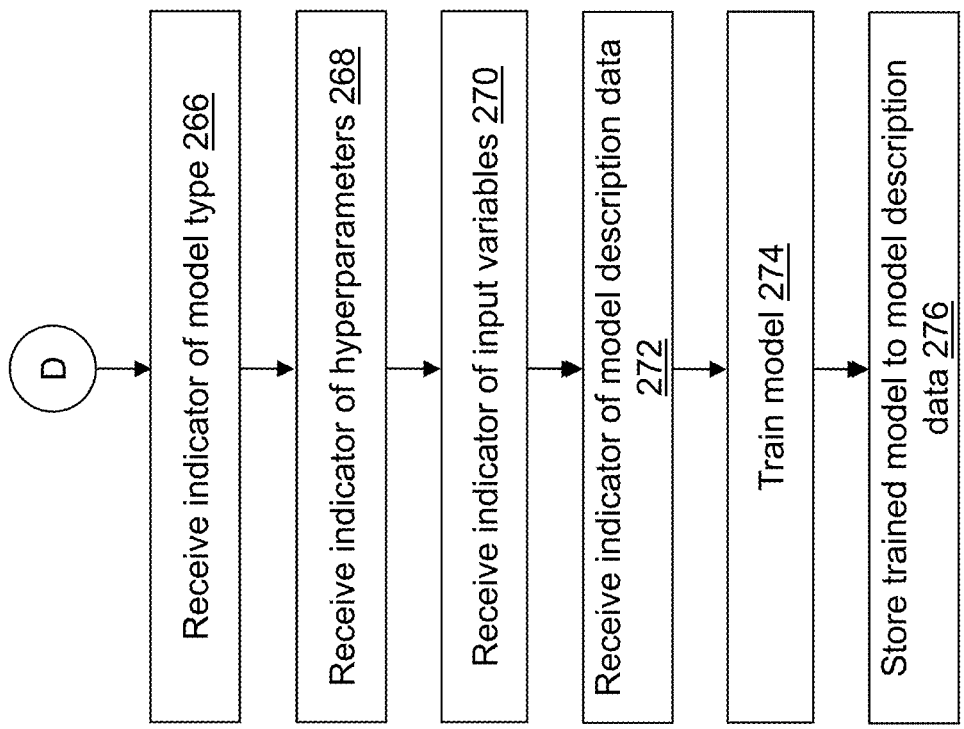

Referring to FIGS. 2A, 2B, and 2C, example operations associated with feature generation application 122 are described. Additional, fewer, or different operations may be performed depending on the embodiment of feature generation application 122. The order of presentation of the operations of FIGS. 2A, 2B, and 2C is not intended to be limiting. Some of the operations may not be performed in some embodiments. Although some of the operational flows are presented in sequence, the various operations may be performed in various repetitions, concurrently (in parallel, for example, using threads and/or distributed computing system 132), and/or in other orders than those that are illustrated. For example, a user may execute feature generation application 122, which causes presentation of a first user interface window, which may include a plurality of menus and selectors such as drop-down menus, buttons, text boxes, hyperlinks, etc. associated with feature generation application 122 as understood by a person of skill in the art. The plurality of menus and selectors may be accessed in various orders. An indicator may indicate one or more user selections from a user interface, one or more data entries input into a data field of the user interface, one or more data items read from computer-readable medium 108 or otherwise defined with one or more default values, etc. that are received as an input by feature generation application 122.

In an operation 200, a first indicator may be received that indicates training dataset 124. For example, the first indicator indicates a location and a name of training dataset 124. As an example, the first indicator may be received by feature generation application 122 after selection from a user interface window or after entry by a user into a user interface window. In an alternative embodiment, training dataset 124 may not be selectable. For example, a most recently created dataset may be used automatically. Training dataset 124 includes a number of observation vectors N.

In an operation 202, a second indicator may be received that indicates a plurality of variables to include in the feature generation process using training dataset 124. For example, the second indicator may indicate a plurality of column numbers or a plurality of column names. As another option, all of the columns may be used by default. Each observation vector $x_i$, i=1, . . . , N read from training dataset 124 may include a value for each variable of the plurality of variables to define m dimensions or features and defines a set of observation vectors $X=[x_1, x_2, \ldots, x_N]$. When a value for a variable of the plurality of variables is missing, the observation vector may not be included in the number of observation vectors N, a value may be computed for the missing variable, for example, based on neighbor values, etc.

In an operation 204, a third indicator may be received that indicates a principal components algorithm and a variance value. As an example, a principal components algorithm may be selected from "SVD", "PCA", "Robust PCA", "Factor Analysis", "Autoregressive Analysis", etc. The principal components algorithm may be labeled or selected in a variety of different manners by the user as understood by a person of skill in the art. In an alternative embodiment, the principal components algorithm may not be selectable, and a single principal components algorithm is implemented in feature generation application 122. For illustration, "PCA" indicates a principal component analysis such as that described by I. T. Jolliffe, Principal Component Analysis, Ch. 6, pp. 111-114 (Springer-Verlag 2nd ed. 2002). For illustration, "Robust PCA" indicates a robust PCA such as that described by Mia Hubert, Peter J. Rousseeuw, and Karlien Vanden Branden, *ROBPCA: A New Approach to Robust Principal Component Analysis*, Technometrics 47:1, 64-79 (2012). For illustration, "Factor Analysis" indicates a factor analysis method such as that described by I. T. Jolliffe, Principal Component Analysis, Ch. 7, pp. 150-165 (Springer-Verlag 2nd ed. 2002). For illustration, "Autoregressive Analysis" indicates an autoregressive analysis method such as that described by Brockwell, Peter J. and Richard A. Davis, Time Series: Theory and Methods, New York: Springer-Verlag, 1987, Chapter 3, pages 83-108.

The variance value may be defined as a percent or a fractional value. In an alternative embodiment, the variance value may not be received. For example, a default value may be stored, for example, in computer-readable medium 108 and used automatically. In another alternative embodiment, the variance value may not be selectable. Instead, a fixed, predefined value may be used. For illustration, a default value of the variance value may be 95% though other values may be used.

In an operation 206, a fourth indicator of a number of iterations T may be received. In an alternative embodiment, the fourth indicator may not be received. For example, a default value may be stored, for example, in computer-readable medium 108 and used automatically. In another alternative embodiment, the number of iterations may not be selectable. Instead, a fixed, predefined value may be used. For illustration, a default value of the number of iterations may be 100 though the number of iterations T may be any value greater than or equal to one.

In an operation 208, a fifth indicator of a number of landmark observation vectors $N_l$ may be received. In an alternative embodiment, the fifth indicator may not be received. For example, a default value may be stored, for example, in computer-readable medium 108 and used automatically. In another alternative embodiment, the number of landmark observation vectors $N_l$ may not be selectable. Instead, a fixed, predefined value may be used or a value may be computed automatically. For illustration, a default value of the number of landmark observation vectors $N_l$ may be selected based on the number of observation vectors N included in training dataset 124. For example, $N_l = min(2^{log_2(N/2)}, 2^{log_2 1024})$ may be used to compute the value for the number of landmark observation vectors $N_l$ instead of receiving the fifth indicator for the value.

In an operation 210, a sixth indicator of a number of nearest landmark observation vectors $N_{nl}$ may be received. In an alternative embodiment, the sixth indicator may not be received. For example, a default value may be stored, for example, in computer-readable medium 108 and used automatically. In another alternative embodiment, the number of nearest landmark observation vectors $N_{nl}$ may not be selectable. Instead, a fixed, predefined value may be used. For illustration, a default value of the number of nearest landmark observation vectors $N_{nl}$ may be selected based on $1 < N_{nl} < N_l < N$.

In an operation 212, a seventh indicator of a neighbor distance value ε may be received. In an alternative embodiment, the seventh indicator may not be received. For example, a default value may be stored, for example, in computer-readable medium 108 and used automatically. In another alternative embodiment, the neighbor distance value ε may not be selectable. Instead, a fixed, predefined value may be used.

In an operation 214, an eighth indicator of a number of neighbor observation vectors $N_n$ may be received. In an alternative embodiment, the eighth indicator may not be received. For example, a default value may be stored, for example, in computer-readable medium 108 and used automatically. In another alternative embodiment, the number of neighbor observation vectors $N_n$ may not be selectable. Instead, a fixed, predefined value may be used. For illustration, a default value of the number of neighbor observation vectors $N_n$ may be between 10 and 30.

In an illustrative embodiment, neighbor distance value ε is provided by the seventh indicator, and number of neighbor observation vectors $N_n$ is provided by the eighth indicator. In another illustrative embodiment, when neighbor distance value ε is provided by the seventh indicator, number of neighbor observation vectors $N_n$ may be computed as a function of neighbor distance value ε such that the distance of the neighbor observation vectors is less than or equal to neighbor distance value ε. In yet another illustrative embodiment, when number of neighbor observation vectors $N_n$ is provided by the eighth indicator, neighbor distance value ε may be computed as the radius that contains the number of neighbor observation vectors $N_n$. In still another illustrative embodiment, when a default value for the number of neighbor observation vectors $N_n$ is used, neighbor distance value ε may be computed as the radius that contains the number of neighbor observation vectors $N_n$.

In an operation 216, a ninth indicator of a regularization parameter $reg_p$ may be received. In an alternative embodiment, the ninth indicator may not be received. For example, a default value may be stored, for example, in computer-readable medium 108 and used automatically. In another alternative embodiment, the regularization parameter $reg_p$ may not be selectable. Instead, a fixed, predefined value may be used. For illustration, a default value of the regularization parameter $reg_p$ may be 0.0001. Use of the regularization parameter $reg_p$ reduces an effect of outliers as shown further below.

In an operation 218, a tenth indicator may be received that indicates a normalization flag value. In an alternative embodiment, the tenth indicator may not be received. For example, a default value may be stored, for example, in computer-readable medium 108 and used automatically. In another alternative embodiment, the normalization flag value may not be selectable. Instead, a fixed, predefined value may be used. For illustration, a default value of the normalization flag value may be true or one.

In an operation 219, an eleventh indicator may be received that indicates feature distance data 126. For example, the eleventh indicator indicates a location and a name of feature distance data 126. As an example, the eleventh indicator may be received by feature generation application 122 after selection from a user interface window or after entry by a user into a user interface window. In an alternative embodiment, feature distance data 126 may not be selectable and a default location and name for storing feature distance data 126 is used. Cluster data further, or in the alternative, may be stored in RAM.

In an operation 220, an iteration number t, a landmark observation vector index i, a nearest landmark observation vector index j, and an observation vector index o are initialized, for example, using t=1, i=1, j=1, and o=1, respectively. A feature distance matrix F having dimension [N,T*$N_l$] may also be initialized to zero.

In an operation 222, the number of landmark observation vectors $N_l$ is randomly selected from the set of observation vectors X to define a set of landmark observation vectors $X_l=[x_{l1}, x_{l2}, \ldots, x_{lN_l}]$. Each landmark observation vector has a value for each variable of the plurality of variables indicated in operation 202 to define m dimensions or features for each landmark observation vector.

For example, referring to FIG. 3, a plurality of dots represents the set of observation vectors X from which a first landmark observation vector 300, a second landmark observation vector 302, a third landmark observation vector 304, a fourth landmark observation vector 306, a fifth landmark observation vector 308, and a sixth landmark observation vector 310 are randomly selected such that $N_l$=6. Each observation vector is defined in three dimensions illustrated as x, y, z that are the features.

Referring again to FIG. 2A, in an operation 224, a next landmark observation vector is selected from the set of landmark observation vectors $X_l$. For example, a first landmark observation vector $x_{l1}$ is selected on a first execution of operation 224, a second landmark observation vector $x_{l2}$ is selected on a second execution of operation 224, etc. until the landmark observation vector index i is reset to i=1 after which the selection process is repeated.

In an operation 226, observation vectors within the neighbor distance value ε relative to the selected next landmark observation vector are identified to define a set of neighborhood observation vectors $X_ε$. For example, referring again to FIG. 3, a neighborhood 312 relative to fourth landmark observation vector 306 defines a subset of the plurality of dots within neighbor distance value ε indicated by a radius 314. The observation vectors represented by the dots included within neighborhood 312 are identified as the set of neighborhood observation vectors $X_ε$.

Referring again to FIG. 2A, in an operation 228, the number of neighbor observation vectors $N_n$ is randomly selected from the set of neighborhood observation vectors $X_ε$ to define a set of neighbor observation vectors $X_{εn}=[X_{n1}, X_{n2}, \ldots, X_{nN_n}]$.

In an operation 230, a determination is made concerning whether the normalization flag value indicates true. When the normalization flag value indicates true, processing continues in an operation 232. When the normalization flag value does not indicate true, processing continues in an operation 236 shown referring to FIG. 2B.

In operation 232, the set of neighbor observation vectors $X_{εn}$ is normalized with respect to the neighborhood defined by the set of neighbor observation vectors $X_{εn}$ so that each dimension of each neighbor observation vector has a value between zero and one based on a maximum value and a minimum value of the set of neighbor observation vectors $X_{εn}$ in each dimension.

In an operation 234, the set of observation vectors X are normalized with respect to the neighborhood's subspace defined by the normalized set of neighbor observation vectors $X_{εn}$. For example, a mean is computed for each dimension of the set of neighbor observation vectors $X_{εn}$ that is subtracted from each respective dimension of each observation vector of the set of observation vectors X to define intermediate observation vectors. The set of observation vectors X are normalized so that each dimension of each observation vector has a value between zero and one based on a maximum value and a minimum value that results from the defined intermediate observation vectors.

Referring to FIG. 2B, in operation 236, a covariance matrix of the neighborhood is computed from the set of neighbor observation vectors $X_{εn}$ that may have been normalized in operation 232.

In an operation 237, eigenvalues and eigenvectors are computed from the computed covariance matrix of the neighborhood using the principal components algorithm indicated in operation 204. The orthogonal basis that maximizes a variance may be defined as $y_i=U^T x_i$, where U can be obtained from the first ρ eigenvectors of $Σ=X^T X$ as $Cov(Y)=U^T ρU$, where Cov(Y) is the covariance matrix of the neighborhood. U can be computed using singular value decomposition (SVD). For illustration, a MWPCA procedure performs principal component analysis using SAS Visual Data Mining and Machine Learning, an RPCA procedure performs robust PCA using SAS Viya, a HPPRINCOMP procedure performs PCA using SAS High-Performance Procedures, a PRINCOMP procedure performs PCA using SAS/STAT, etc.

In an operation 238, the eigenvectors that correspond to the eigenvalues of the covariance matrix required to reach the variance value indicated in operation 204 are selected from U to define a plurality of principal components that together define a neighborhood subspace.

In an operation 240, each observation vector of the set of observation vectors X that may have been normalized in operation 234 is projected to the neighborhood subspace defined by the selected eigenvectors. Linearly projecting data to a subspace allows for a mapping between the original space and the new space. For illustration, the MWPCA procedure, the RPCA procedure, the HPPRINCOMP procedure, the PRINCOMP procedure compute principal component scores that are the coordinates of projection in the new space.

Figure 4:
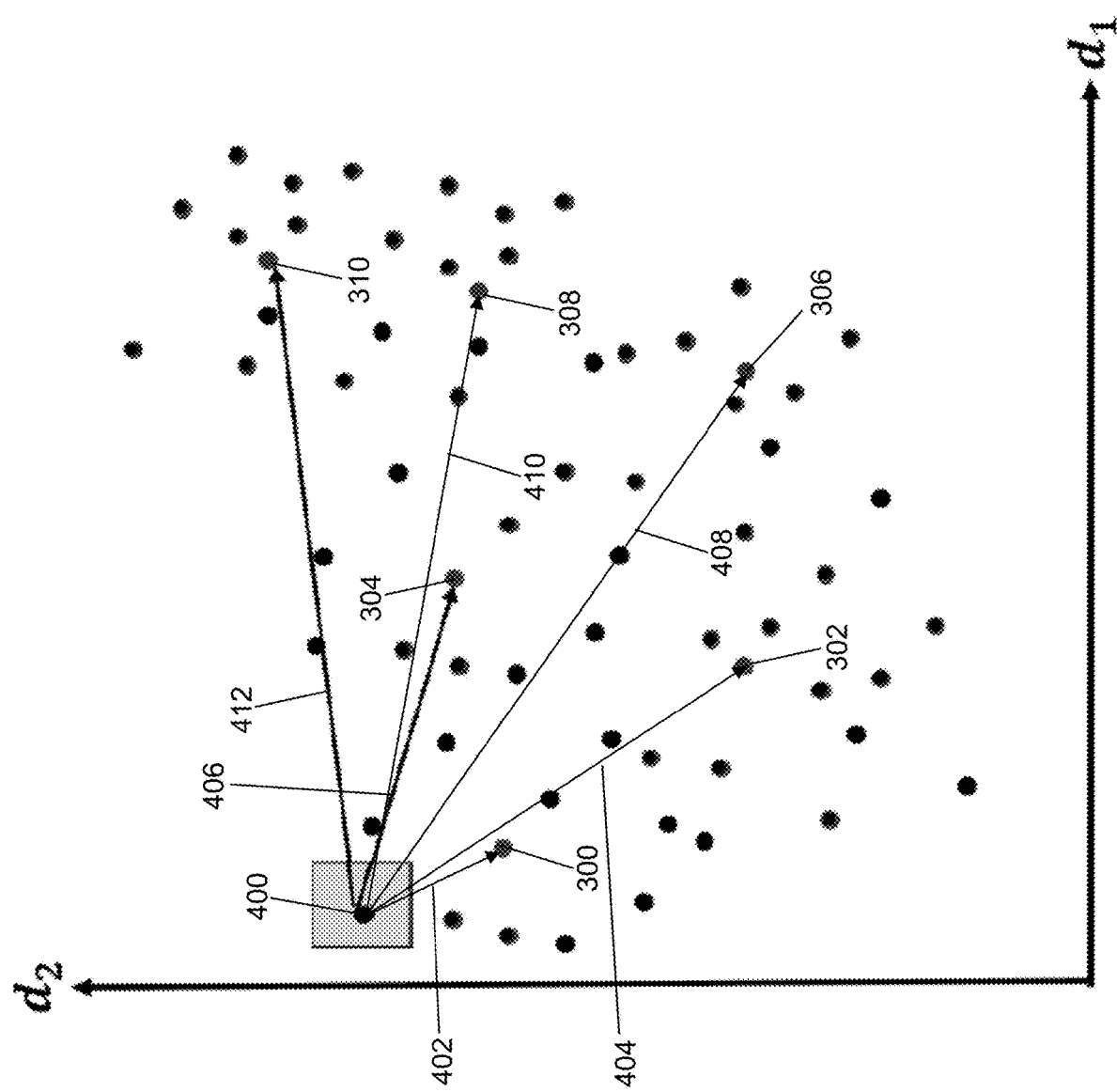
FIG. 4 shows a nearest landmark observation vector selection by the feature generation application of FIGS. 2A, 2B, and 2C in accordance with an illustrative embodiment.

In an operation 242, a distance between each projected observation vector of the set of observation vectors X and the selected next landmark observation vector is computed. In an illustrative embodiment, the distance computed is a Euclidian distance though a different method of computing the distance may be used. For example, referring to FIG. 4, a first distance 402 between a first projected observation vector 400 and first landmark observation vector 300 is shown. First projected observation vector 400 is the first observation vector projected from the x, y, z into the subspace illustrated as $d_1$, $d_2$ and defined by the computed dimensions. A second distance 404 between first projected observation vector 400 and second landmark observation vector 302 is shown. A third distance 406 between first projected observation vector 400 and third landmark observation vector 304 is shown. A fourth distance 408 between first projected observation vector 400 and fourth landmark observation vector 306 is shown. A fifth distance 410 between first projected observation vector 400 and fifth landmark observation vector 308 is shown. A sixth distance 412 between first projected observation vector 400 and sixth landmark observation vector 310 is shown.

Referring again to FIG. 2B, in an operation 244, the computed distances are stored in an $i^{th}$ column of a landmark distance matrix D(N,i).

In an operation 246, a determination is made concerning whether there is another landmark observation vector of the set of landmark observation vectors $X_l=[x_{l1}, x_{l2}, \ldots, x_{lN_l}]$ to process. When $i \leq N_l$, processing continues in operation 224 to select a next landmark observation vector after incrementing i=i+1. When $i>N_l$, processing continues in an operation 248.

In operation 248, a next observation vector is selected from the set of observation vectors X. For example, a first observation vector $x_1$ is selected on a first execution of operation 248, a second observation vector $x_2$ is selected on a second execution of operation 248, etc. using the observation vector index o.

In an operation 250, an average distance between the selected next observation vector and each landmark is computed, for example, using $D_{mean}=(\Sigma_{i=1}^{N_l} D(o,i))/N_l$.

In an operation 252, the number of nearest landmark observation vectors $N_{nl}$ is selected from the set of landmark observation vectors $X_l=[x_{l1}, x_{l2}, \ldots, x_{lN_l}]$ based on having the $N_{n1}$ minimum distance values stored in D(o,i), i=1, \ldots, N_1 to define a set of nearest landmark observation vectors $X_{nl}=[xx_{nl1},x_{nl2},\ldots,x_{nlN_{nl}}]$. An index vector $I_{nl}$ may be created to indicate the index of each selected nearest landmark observation vector in $X_l=[x_{l1}, x_{l2}, \ldots, x_{lN_l}]$. For example, if $N_l=10$ and $N_{nl}=5$, and the set of nearest landmark observation vectors includes landmark observation vectors 1, 3, 7, 8, and 10, $I_{nl}=[1, 3, 7, 8, 10]$.

In an operation 253, a next nearest landmark observation vector is selected from the set of nearest landmark observation vectors $X_{nl}=[x_{nl1}, x_{nl2}, \ldots, x_{nlN_{nl}}]$. For example, for the illustrative $I_{nl}=[1, 3, 7, 8, 10]$, a first nearest landmark observation vector $x_{nl1}$ that is the first landmark observation vector is selected on a first execution of operation 253, a second nearest landmark observation vector $x_{nl2}$ that is the third landmark observation vector is selected on a second execution of operation 253, a third nearest landmark observation vector $x_{nl3}$ that is the seventh landmark observation vector is selected on a third execution of operation 253, a fourth nearest landmark observation vector $x_{nl4}$ that is the eighth landmark observation vector is selected on a fourth execution of operation 253, and a fifth nearest landmark observation vector $x_{xl5}$ that is the tenth landmark observation vector is selected on a fifth execution of operation 253.

In an operation 254, a landmark distance value is computed for the nearest landmark observation vector index $k=I_{nl}[j]$, for example, using $D_k=\max(D_{mean}-D(o,k), reg_p*D_{mean})$.

In an operation 256, the computed landmark distance value is added to a feature distance matrix $F[o,k+(t-1)*N_l]=D_k$. The feature distance matrix may be stored in feature distance data 126. Only the $N_{n1}$ minimum distance values defined by the selected set of nearest landmark observation vectors $X_{n1}=[x_{nl1}, x_{nl2}, \ldots, x_{nlN_{nl}}]$ have a non-zero value though the feature distance matrix F has dimension $[N,T*N_l]$. As a result, the feature distance matrix F is sparse.

In an operation 258, a determination is made concerning whether there is another nearest landmark observation vector of the set of nearest landmark observation vectors $x_{n1}=[x_{nl1}, x_{nl2}, \ldots, x_{nlN_{nl}}]$ to process. When $j \leq N_{nl}$, processing continues in operation 253 to select a next nearest landmark observation vector after incrementing j=j+1. When $j>N_{nl}$, processing continues in an operation 260.

In operation 260, a determination is made concerning whether there is another observation vector of the set of observation vectors X to process. When $o \leq N$, processing continues in operation 248 to select a next observation vector after incrementing o=o+1 and reinitializing the nearest landmark observation vector index j=1. When o>N, processing continues in an operation 262.

In operation 262, a determination is made concerning whether there is another iteration to process. When $t \leq T$, processing continues in an operation 264. When t>T, processing continues in an operation 266 shown referring to FIG. 2C.

In operation 264, the iteration number t is incremented, and the landmark observation vector index i, the nearest landmark observation vector index j, and the observation vector index o are reinitialized, for example, using t=t+1, i=1, j=1, and o=1, respectively, and processing continues in operation 222.

Figure 5:
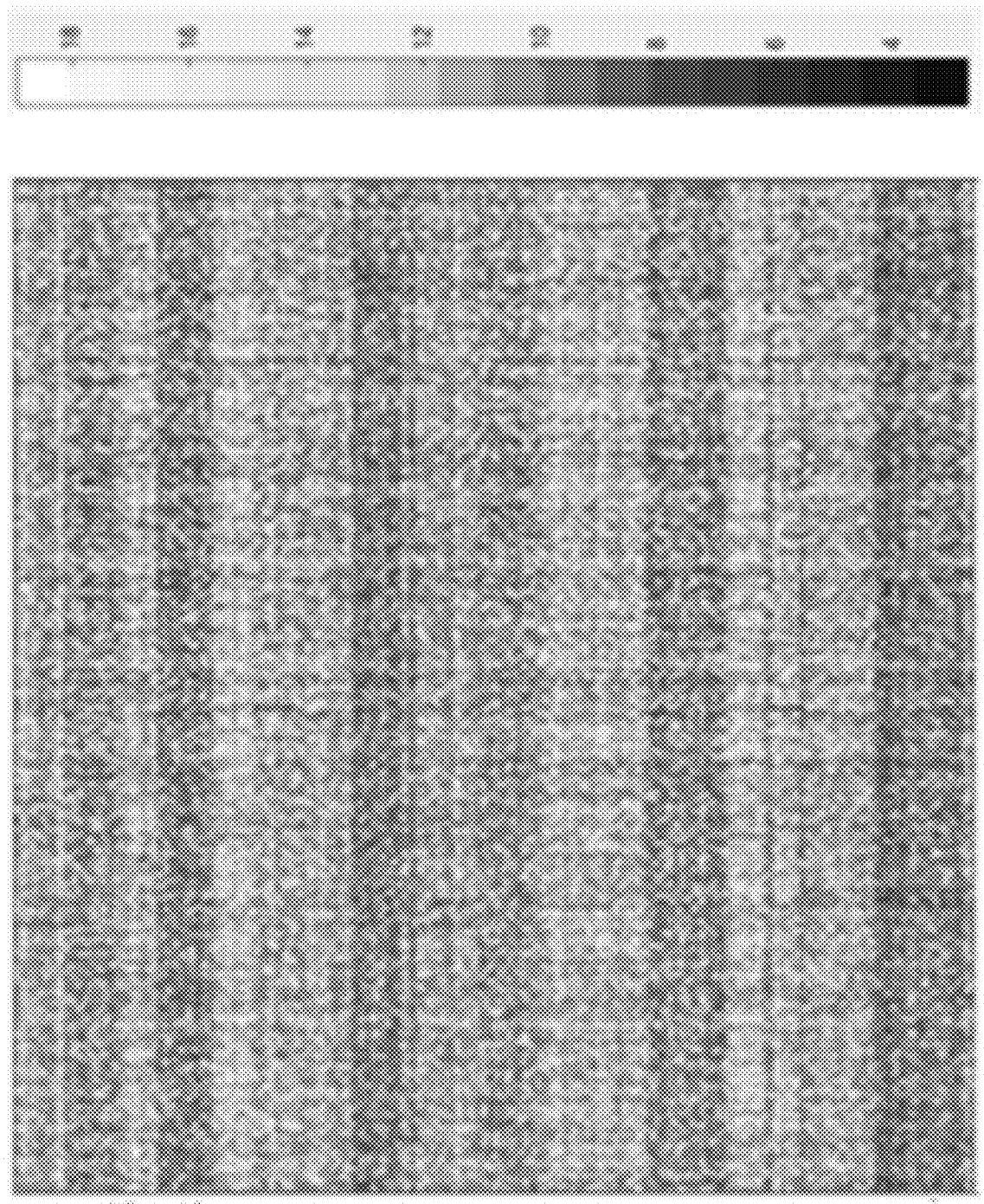
FIG. 5 shows a sparse feature matrix computed by the feature generation application of FIGS. 2A, 2B, and 2C in accordance with an illustrative embodiment (color).

Referring to FIG. 5, a graph of feature distance matrix $F[o,j+(t-1)N_l]$ is shown for t=1, \ldots, 100 iterations, for each landmark with j=1, \ldots, $N_{nl}=N_l=6$, and using a Japanese Vowel dataset with N=9960 and m=15. Brighter regions correspond to non-zero regions with distance values in the matrix while darker regions show empty spaces.

The feature distance matrix stored in feature distance data 126 is not a reconstruction of training dataset 124, but a sparser representation identified using locally relevant subspaces. These subspaces are disjoint and low dimensional compared to the dimension of the original space. Once projected to these local subspaces, observation vectors in training dataset 124 are described by distances from the nearest landmarks in each subspace. These landmarks were chosen randomly and the neighborhood around them defines the subspace for each landmark. The distances, which are the features stored in feature distance data 126, are encoded with respect to these global landmarks. The final feature representation stored in feature distance data 126 is a union of the features from all the chosen subspaces though those that are not the nearest have zero value.

Referring to FIG. 2C, in operation 266, a twelfth indicator indicates a model type. For example, the twelfth indicator indicates a name of a model type that performs classification. The twelfth indicator may be received by feature generation application 122 from a user interface window or after entry by a user into a user interface window. A default value for the model type may further be stored, for example, in computer-readable medium 108. As an example, a model type may be selected from "SVM", "K-Cluster", "Neural Network", "LOG REG", "Forest", "Gradient Boosting", "Decision Tree", etc. The model type indicated by "SVM" may refer to a support vector machine (SVM) model type. The model type indicated by "K-Cluster" may refer to a k-means clustering model type. The model type indicated by "Neural Network" may refer to a neural network model type. The model type indicated by "LOG REG" may refer to a logistic regression model type. The model type indicated by "Forest" may refer to a random forest model type. The model type indicated by "Gradient Boosting" may refer to a gradient boosting model type. The model type indicated by "Decision Tree" may refer to a decision tree model type. For example, a default model type may be indicated by "SVM". Of course, the model type may be labeled or selected in a variety of different manners by the user as understood by a person of skill in the art. In an alternative embodiment, the model type may not be selectable, and a single model type is implemented by feature generation application 122. For example, the model type indicated as "SVM" may be used by default or without allowing a selection.

In an operation 268, a thirteenth indicator of one or more hyperparameters to use for training and validating the indicated model type are received.

In an operation 270, a fourteenth indicator may be received that indicates a plurality of input variables to include in the model training process from training dataset 124 and/or feature distance data 126. For example, the fourteenth indicator may indicate a plurality of column numbers or a plurality of column names. As another option, all of the columns of training dataset 124 and/or feature distance data 126 may be used by default.

In an operation 272, a fifteenth indicator may be received that indicates model description data 130. For example, the fifteenth indicator indicates a location and a name of model description data 130. As an example, the fifteenth indicator may be received by feature generation application 122 after selection from a user interface window or after entry by a user into a user interface window. In an alternative embodiment, model description data 130 may not be selectable and a default location and name for storing model description data 130 is used. Model description data further, or in the alternative, may be stored in RAM.

In an operation 274, a model is trained using each observation vector read from training dataset 124 and/or feature distance data 126 based on the model type selected in operation 266, the hyperparameters selected in operations 268, and the input variables selected in operations 270. For example, the model may be trained and validated using training application 128 that is distinct from feature generation application 122 or is integrated with feature generation application 122. Training application 128 performs operations associated with defining model description data 130. Some or all of the operations described herein may be embodied in training application 128. The operations may be implemented using hardware, firmware, software, or any combination of these methods.

Referring to the example embodiment of FIG. 1, training application 128 is implemented in software (comprised of computer-readable and/or computer-executable instructions) stored in computer-readable medium 108 and accessible by processor 110 for execution of the instructions that embody the operations of training application 128 though alternatively training application 128 may be stored on a computer-readable memory of distributed computing system 132. Training application 128 may be written using one or more programming languages, assembly languages, scripting languages, etc. Training application 128 may be integrated with other analytic tools. As an example, training application 128 may be part of an integrated data analytics software application and/or software architecture such as that offered by SAS Institute Inc. of Cary, N.C., USA. Merely for illustration, training application 128 may be implemented using or integrated with one or more SAS software tools such as JMP®, Base SAS, SAS® Enterprise Miner™, SAS® Event Stream Processing, SAS/STAT®, SAS® High Performance Analytics Server, SAS® Visual Data Mining and Machine Learning, SAS® LASR™, SAS® Cloud Analytic Services, SAS/OR®, SAS/ETS®, SAS® Viya™, SAS In-Memory Statistics for Hadoop®, etc., all of which are developed and provided by SAS Institute Inc. of Cary, N.C., USA. Training application 128 may be implemented as a Web application. For example, training application 128 may use the HPSVM procedure implemented by SAS® Enterprise Miner™ software, the SVMACHINE procedure implemented by SAS® Visual Data Mining and Machine Learning software, the HPLOGISTIC procedure implemented by SAS/STAT® software, the NNET procedure provided by the SAS® Visual Data Mining and Machine Learning software, etc.

In an operation 276, the data that describes the trained model is stored in model description data 130. For illustration, the trained model may be stored using the ASTORE procedure provided by SAS® Visual Data Mining and Machine Learning software. For scoring new data, the landmark observation vectors and the principal components associated with the landmark observation vectors also may be stored in model description data 130 to compute the additional features for new observations.

Figure 6:
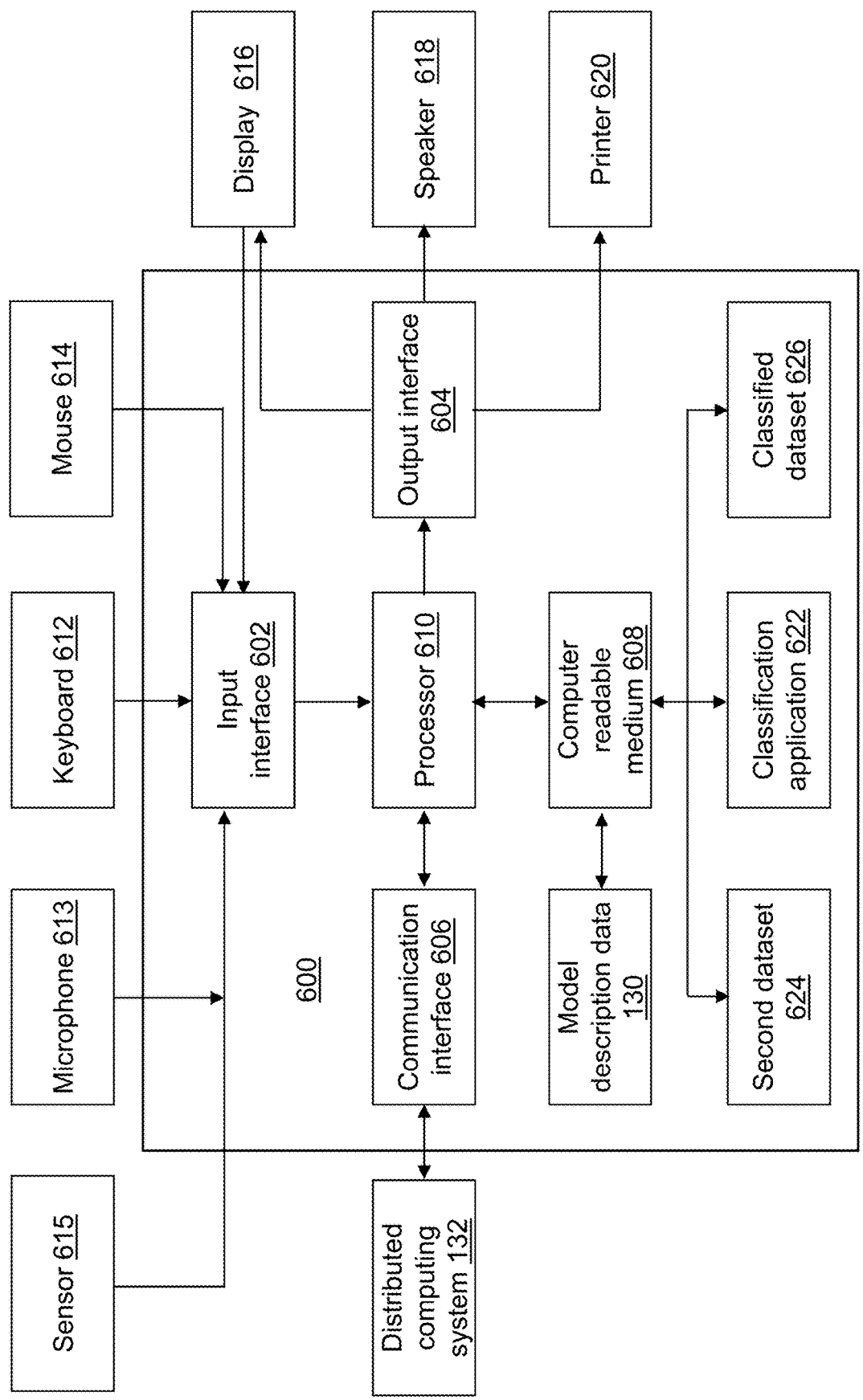
FIG. 6 depicts a block diagram of a classification device in accordance with an illustrative embodiment.

Referring to FIG. 6, a block diagram of a classification device 600 is shown in accordance with an illustrative embodiment. Classification device 600 may include a second input interface 602, a second output interface 604, a second communication interface 606, a second non-transitory computer-readable medium 608, a second processor 610, a classification application 622, model description data 130, a second dataset 624, and a classified dataset 626. Fewer, different, and/or additional components may be incorporated into classification device 600. Classification device 600 and feature generation device 100 may be the same or different devices.

Second input interface 602 provides the same or similar functionality as that described with reference to input interface 102 of feature generation device 100 though referring to classification device 600. Second output interface 604 provides the same or similar functionality as that described with reference to output interface 104 of feature generation device 100 though referring to classification device 600. Second communication interface 606 provides the same or similar functionality as that described with reference to communication interface 106 of feature generation device 100 though referring to classification device 600. Data and messages may be transferred between classification device 600 and distributed computing system 132 using second communication interface 606. Second computer-readable medium 608 provides the same or similar functionality as that described with reference to computer-readable medium 108 of feature generation device 100 though referring to classification device 600. Second processor 610 provides the same or similar functionality as that described with reference to processor 110 of feature generation device 100 though referring to classification device 600.

Classification application 622 performs operations associated with classifying data stored in second dataset 624 and/or identifying outliers in second dataset 624 that are stored in classified dataset 626 to support various data analysis functions as well as provide alert/messaging related to the classified data and/or identified outliers. Dependent on the type of data stored in training dataset 124 and second dataset 624, classification application 622 may identify anomalies as part of process control, for example, of a manufacturing process, for machine condition monitoring, for example, an electro-cardiogram device, for image classification, for intrusion detection, for fraud detection, etc. Some or all of the operations described herein may be embodied in classification application 622. The operations may be implemented using hardware, firmware, software, or any combination of these methods.

Referring to the example embodiment of FIG. 6, classification application 622 is implemented in software (comprised of computer-readable and/or computer-executable instructions) stored in second computer-readable medium 608 and accessible by second processor 610 for execution of the instructions that embody the operations of classification application 622. Classification application 622 may be written using one or more programming languages, assembly languages, scripting languages, etc. Classification application 622 may be integrated with other analytic tools. As an example, classification application 622 may be part of an integrated data analytics software application and/or software architecture such as that offered by SAS Institute Inc. of Cary, N.C., USA. For example, classification application 622 may be part of SAS® Enterprise Miner™ developed and provided by SAS Institute Inc. of Cary, N.C., USA that may be used to create highly accurate predictive and descriptive models based on analysis of vast amounts of data from across an enterprise. Merely for further illustration, classification application 622 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, all of which are developed and provided by SAS Institute Inc. of Cary, N.C., USA. One or more operations of classification application 622 further may be performed by an ESPE. Classification application 622, feature generation application 122, and/or training application 128 further may be integrated applications.

Classification application 622 may be implemented as a Web application. Classification application 622 may be integrated with other system processing tools to automatically process data generated as part of operation of an enterprise, to classify data in the processed data, to identify any outliers in the processed data, and/or to provide a warning or alert associated with the data classification and/or outlier identification using second input interface 602, second output interface 604, and/or second communication interface 606 so that appropriate action can be initiated in response. For example, a warning or an alert may be presented using a second display 616, a second speaker 618, a second printer 620, etc. or sent to one or more computer-readable media, display, speaker, printer, etc. of distributed computing system 132.

Training dataset 124 and second dataset 624 may be generated, stored, and accessed using the same or different mechanisms. Similar to training dataset 124, second dataset 624 may include a plurality of rows and a plurality of columns with the plurality of rows referred to as observations or records, and the columns referred to as variables (features/dimensions) that are associated with an observation. Second dataset 624 may be transposed.

Similar to training dataset 124, second dataset 624 may be stored on second computer-readable medium 608 or on one or more computer-readable media of distributed computing system 132 and accessed by classification device 600 using second communication interface 606. Data stored in second dataset 624 may be a sensor measurement or a data communication value, for example, from a sensor 615, may be generated or captured in response to occurrence of an event or a transaction, generated by a device such as in response to an interaction by a user with the device, for example, from a second keyboard 612 or a second mouse 614, or a second microphone 613, etc. The data stored in second dataset 624 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in second dataset 624 may be captured at different time points periodically, intermittently, when an event occurs, etc. One or more columns may include a time value. Similar to training dataset 124, data stored in second dataset 624 may be generated as part of the IoT, and some or all data may be pre- or post-processed by an ESPE.

Similar to training dataset 124, second dataset 624 may be stored in various compressed formats such as a coordinate format, a compressed sparse column format, a compressed sparse row format, etc. Second dataset 624 further may be stored using various structures as known to those skilled in the art including a file system, a relational database, a system of tables, a structured query language database, etc. on feature generation device 100, on classification device 600, and/or on distributed computing system 132. Classification device 600 and/or distributed computing system 132 may coordinate access to second dataset 624 that is distributed across a plurality of computing devices. For example, second dataset 624 may be stored in a cube distributed across a grid of computers as understood by a person of skill in the art. As another example, second dataset 624 may be stored in a multi-node Hadoop® cluster. As another example, second dataset 624 may be stored in a cloud of computers and accessed using cloud computing technologies, as understood by a person of skill in the art. The SAS® LASR™ Analytic Server and/or SAS® Viya™ may be used as an analytic platform to enable multiple users to concurrently access data stored in second dataset 624.

Referring to FIG. 7, example operations of classification application 622 are described. Additional, fewer, or different operations may be performed depending on the embodiment of classification application 622. The order of presentation of the operations of FIG. 7 is not intended to be limiting. Although some of the operational flows are presented in sequence, the various operations may be performed in various repetitions, concurrently (in parallel, for example, using threads and/or a distributed computing system), and/or in other orders than those that are illustrated.

In an operation 700, a sixteenth indicator may be received that indicates second dataset 624. For example, the sixteenth indicator indicates a location and a name of second dataset 624. As an example, the sixteenth indicator may be received by classification application 622 after selection from a user interface window or after entry by a user into a user interface window. In an alternative embodiment, second dataset 624 may not be selectable. For example, a most recently created dataset may be used automatically.

In an operation 702, a seventeenth indicator may be received that indicates a plurality of variables of second dataset 624 to include in the classification process. For example, the seventeenth indicator may indicate a plurality of column numbers or a plurality of column names. As another option, all of the columns may be used by default.

In an operation 704, an eighteenth indicator may be received that indicates model description data 130. For example, the eighteenth indicator indicates a location and a name of model description data 130. As an example, the eighteenth indicator may be received by classification application 622 after selection from a user interface window or after entry by a user into a user interface window. In an alternative embodiment, model description data 130 may not be selectable. For example, model description data 130 may be retrieved from a predefined location.

In an operation 706, a nineteenth indicator may be received that indicates classified dataset 626. For example, the nineteenth indicator indicates a location and a name of classified dataset 626. As an example, the nineteenth indicator may be received by classification application 622 after selection from a user interface window or after entry by a user into a user interface window. In an alternative embodiment, classified dataset 626 may not be selectable. For example, classified dataset 626 may be stored to a predefined location. When classification application 622 is implemented using an ESPE, the classified data may be streamed to distributed computing system 132.

In an operation 708, a classification model is instantiated from the data read from model description data 130 that describes the trained model.

In an operation 710, a next observation vector is read from second dataset 624. When classification application 622 is implemented using an ESPE, the first observation vector may be read from an event block object streamed to classification device 600 from distributed computing system 132.

In an operation 711, the additional features for the selected next observation vector are computed using the stored landmark observation vectors and the principal components associated with the landmark observation vectors.

In an operation 712, a classification for the selected next observation vector is computed using the instantiated classification model with the selected next observation vector and with the computed additional features.

In an operation 714, a classification indicator is output, for example, by storing the classification to classified dataset 626, presenting the classification on second display 1016, printing the classification on second printer 1020, sending a message to another computing device of distributed computing system 132 indicating the classification using second communication interface 1006, etc.

In an operation 716, a determination is made concerning whether or not second dataset 624 includes another observation. When second dataset 624 includes another observation, processing continues in operation 710. When second dataset 624 does not include another observation, processing continues in an operation 718.

In operation 718, overall classification results may be output, for example, by storing the overall classification results to classified dataset 626, presenting the overall classification results on second display 1016, printing the overall classification results on second printer 1020, sending a message to another computing device of distributed computing system 132 indicating the overall classification results using second communication interface 1006, etc.

There are applications for classification application 622 in areas such as process control and equipment health monitoring, image processing and classification, data segmentation, etc.

Figure 8A:
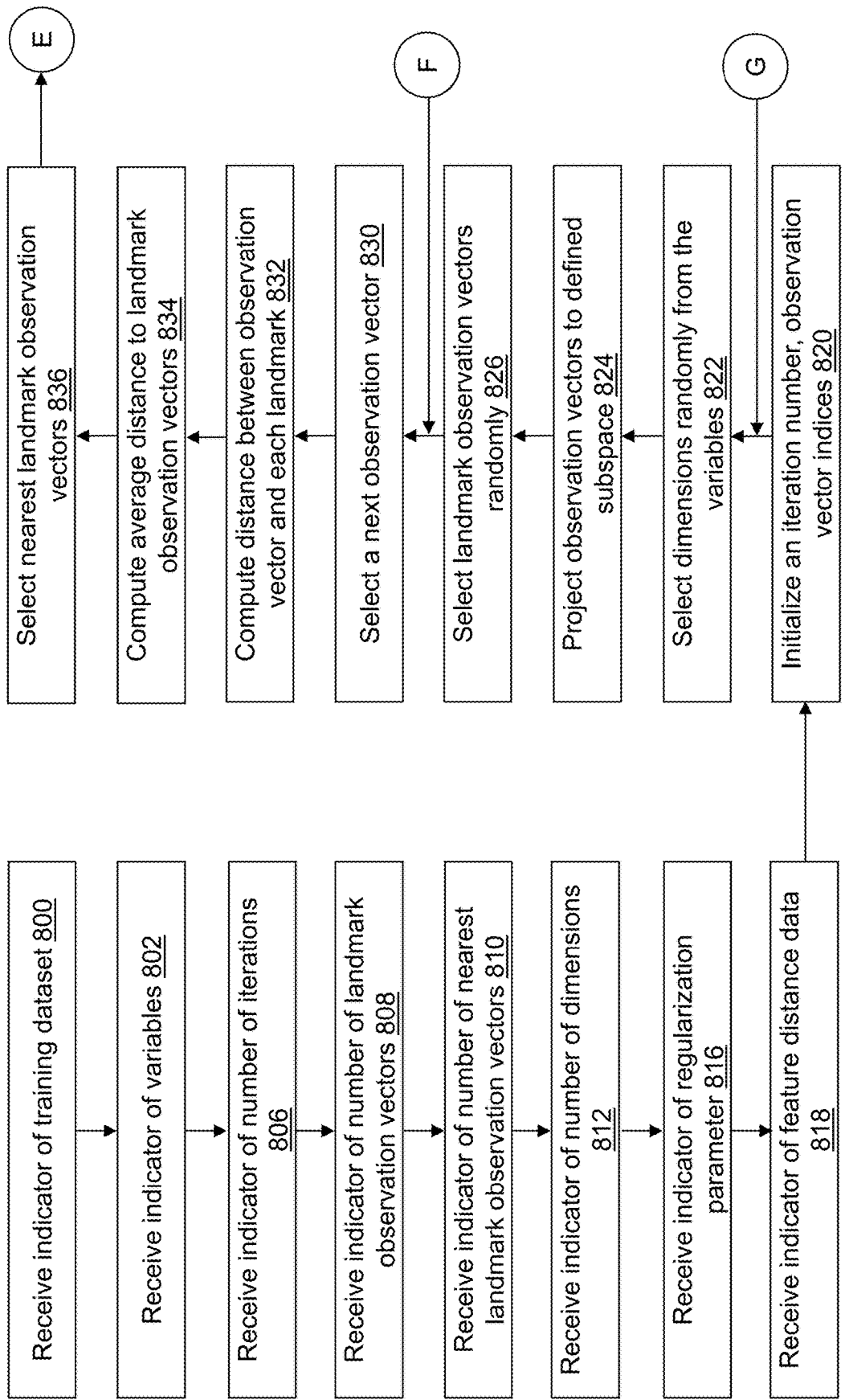
FIGS. 8A and 8B depict a flow diagram illustrating examples of operations performed by a second feature generation application of the feature generation device of FIG. 1 in accordance with an illustrative embodiment.
Figure 8B:
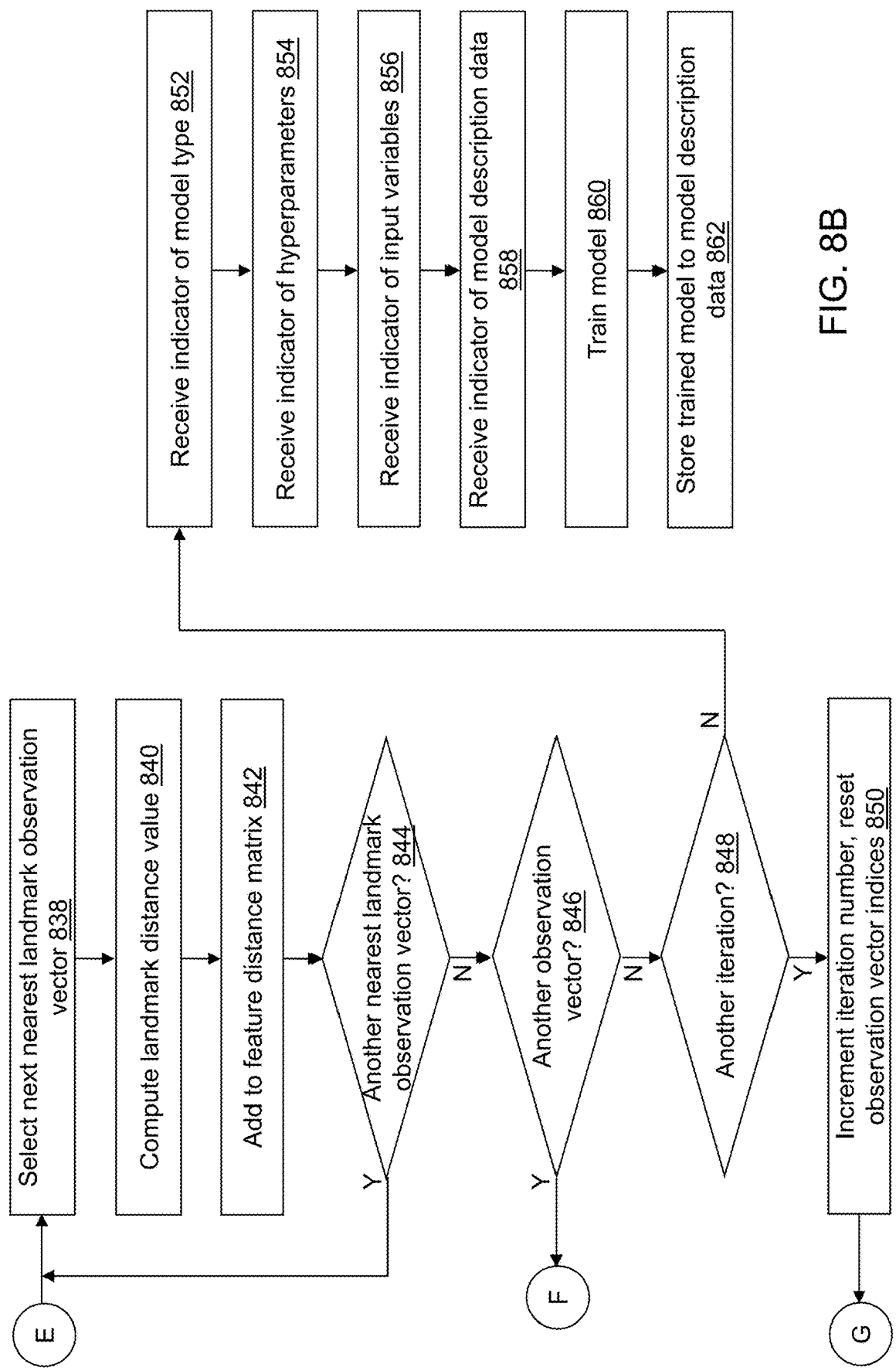

Referring to FIGS. 8A and 8B, example operations associated with a first variant of feature generation application 122 are described. Additional, fewer, or different operations may be performed depending on the embodiment of feature generation application 122. The order of presentation of the operations of FIGS. 8A and 8B is not intended to be limiting. Some of the operations may not be performed in some embodiments.

Similar to operation 200, in an operation 800, the first indicator may be received that indicates training dataset 124.

Similar to operation 202, in an operation 802, the second indicator may be received that indicates the plurality of variables to include in the feature generation process using training dataset 124.

Similar to operation 206, in an operation 806, the fourth indicator of the number of iterations T may be received.

Similar to operation 208, in an operation 808, the fifth indicator of the number of landmark observation vectors $N_l$ may be received.

Similar to operation 210, in an operation 810, the sixth indicator of the number of nearest landmark observation vectors $N_{nl}$ may be received.

In an operation 812, a twentieth indicator of the number of dimensions $N_D$ may be received. In an alternative embodiment, the twentieth indicator may not be received. For example, a default value may be stored, for example, in computer-readable medium 108 and used automatically. In another alternative embodiment, the number of dimensions $N_D$ may not be selectable. Instead, a fixed, predefined value may be used or a value may be computed automatically. For illustration, a default value of the number of dimensions $N_D$ may be selected based on the number of the plurality of variables indicated in operation 802 to define m dimensions or features for each observation vector included in training dataset 124. For example, $0.1\ m \le N_D \le 0.4\ m$ may be used to compute the value for the number of dimensions $N_D$ instead of receiving the twentieth indicator for the value.

Similar to operation 216, in an operation 816, the ninth indicator of the regularization parameter $reg_p$ may be received.

Similar to operation 219, in an operation 818, the eleventh indicator may be received that indicates feature distance data 126.

Similar to operation 220, in an operation 820, the iteration number t, the nearest landmark observation vector index j, and the observation vector index o are initialized, for example, using $t=1$, $j=1$, and $o=1$, respectively.

In an operation 822, the number of dimensions $N_D$ is randomly selected from the plurality of variables to define $N_D$ dimensions or features for each observation vector.

In an operation 824, each observation vector is projected into the subspace using the selected dimensions.

Similar to operation 222, in an operation 826, the number of landmark observation vectors $N_l$ is randomly selected from the set of observation vectors X to define the set of landmark observation vectors $X_l=[x_{l1}, x_{l2}, \ldots, x_{lN_l}]$. Each landmark observation vector has a value for each variable of the defined dimensions.

Similar to operation 248, in an operation 830, the next observation vector is selected from the set of observation vectors X.

In an operation 832, a distance $D(o,i), i=1, \ldots, N_l$ between the selected next observation vector and each selected landmark observation vector of set of landmark observation vectors $X_l$ is computed in the projected subspace of operation 824.

Similar to operation 250, in an operation 834, an average distance between the selected next observation vector and each landmark is computed, for example, using $D_{mean}=(\Sigma_{i=1}^{N_l} D(o,i))/N_l$.

Similar to operation 252, in an operation 836, the number of nearest landmark observation vectors $N_{nl}$ is selected from the set of landmark observation vectors $X_l=[x_{l1}, x_{l2}, \ldots, x_{lN_l}]$ based on having the $N_{nl}$ minimum distance values stored in $D(o,i), i=1, \ldots, N_l$ to define a set of nearest landmark observation vectors $X_{nl}=[x_{nl1}, x_{nl2}, \ldots, x_{nlN_{nl}}]$.

Referring to FIG. 8B, similar to operation 253, in an operation 838, the next nearest landmark observation vector is selected from the set of nearest landmark observation vectors $X_{nl}=[x_{nl1}, x_{nl2}, \ldots, x_{nlN_{nl}}]$.

Similar to operation 254, in an operation 840, a landmark distance value is computed for the nearest landmark observation vector index $k=I_{nl}[j]$, for example, using $D_k = \max(D_{mean}-D(o,k), reg_p * D_{mean})$.

Similar to operation 256, in an operation 842, the computed landmark distance value is added to the feature distance matrix $F[o, k+(t-1)*N_l]=D_k$.

Similar to operation 258, in an operation 844, a determination is made concerning whether there is another nearest landmark observation vector of the set of nearest landmark observation vectors $X_{nl}=[x_{nl1}, x_{nl2}, \ldots, x_{nlN_{nl}}]$ to process. When $j \leq N_{nl}$, processing continues in operation 838 to select the next nearest landmark observation vector after incrementing $j=j+1$. When $j>N_{nl}$, processing continues in an operation 846.

Similar to operation 260, in operation 846, a determination is made concerning whether there is another observation vector of the set of observation vectors X to process. When $o \leq N$, processing continues in operation 830 to select a next observation vector after incrementing $o=o+1$ and reinitializing the nearest landmark observation vector index $j=1$. When $o>N$, processing continues in an operation 848.

Similar to operation 262, in operation 848, a determination is made concerning whether there is another iteration to process. When $t \leq T$, processing continues in an operation 850. When $t>T$, processing continues in an operation 852.

Similar to operation 264, in operation 850, the iteration number t is incremented, and the nearest landmark observation vector index j and the observation vector index o are reinitialized, for example, using $t=t+1$, $j=1$, and $o=1$, respectively, and processing continues in operation 822.

Similar to operation 266, in operation 852, the twelfth indicator indicates the model type.

Similar to operation 268, in an operation 854, the thirteenth indicator of one or more hyperparameters to use for training and validating the indicated model type are received.

Similar to operation 270, in an operation 856, the fourteenth indicator may be received that indicates a plurality of input variables to include in the model training process from training dataset 124 and/or feature distance data 126.

Similar to operation 272, in an operation 858, the fifteenth indicator may be received that indicates model description data 130.

Similar to operation 274, in an operation 860, the model is trained using each observation vector read from training dataset 124 and/or feature distance data 126 based on the model type selected in operation 852, the hyperparameters selected in operations 854, and the input variables selected in operations 856.

Similar to operation 276, in an operation 862, the data that describes the trained model is stored in model description data 130.

Figure 9A:
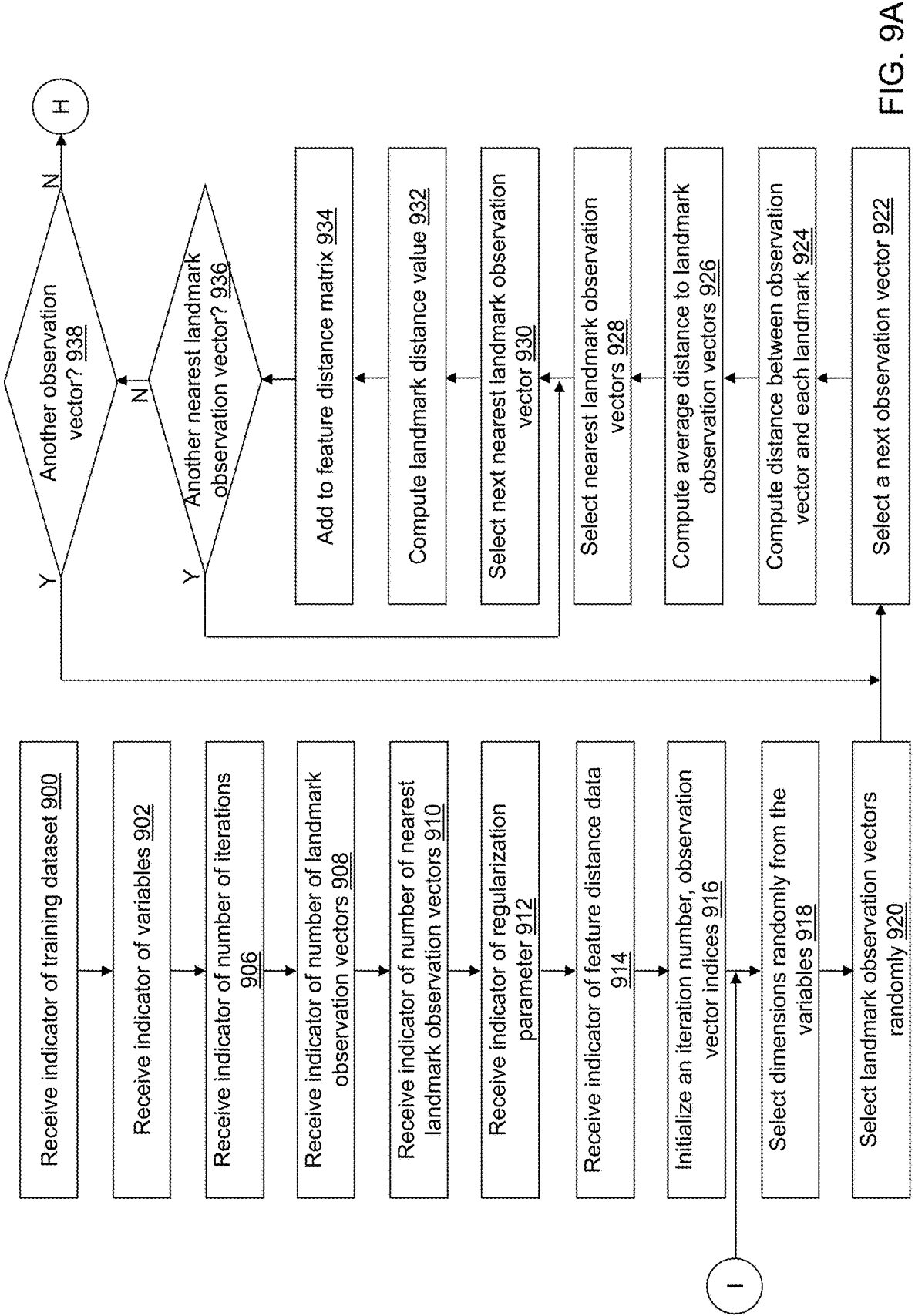

Referring to FIGS. 9A and 9B, example operations associated with a second variant of feature generation application 122 are described. Additional, fewer, or different operations may be performed depending on the embodiment of feature generation application 122. The order of presentation of the operations of FIGS. 9A and 9B is not intended to be limiting. Some of the operations may not be performed in some embodiments.

Similar to operation 200, in an operation 900, the first indicator may be received that indicates training dataset 124.

Similar to operation 202, in an operation 902, the second indicator may be received that indicates the plurality of variables to include in the feature generation process using training dataset 124.

Similar to operation 206, in an operation 906, the fourth indicator of the number of iterations T may be received.

Similar to operation 208, in an operation 908, the fifth indicator of the number of landmark observation vectors $N_l$ may be received.

Similar to operation 210, in an operation 910, the sixth indicator of the number of nearest landmark observation vectors $N_{nl}$ may be received.

Similar to operation 216, in an operation 912, the ninth indicator of the regularization parameter $reg_p$ may be received.

Similar to operation 219, in an operation 914, the eleventh indicator may be received that indicates feature distance data 126.

Similar to operation 220, in an operation 916, the iteration number t, the nearest landmark observation vector index j, and the observation vector index o are initialized, for example, using $t=1$, $j=1$, and $o=1$, respectively.

In an operation 918, a random number of dimensions is randomly selected from the plurality of variables to define $N_D$ dimensions or features for each observation vector.

Similar to operation 222, in an operation 920, the number of landmark observation vectors $N_l$ is randomly selected from the set of observation vectors X to define the set of landmark observation vectors $X_l=[x_{l1}, x_{l2}, \ldots, x_{lN_l}]$. Each landmark observation vector has a value for each variable of the defined dimensions.

Similar to operation 248, in an operation 922, the next observation vector is selected from the set of observation vectors X.

Similar to operation 832, in an operation 924, the distance $D(o,i), i=1, \ldots, N_l$ between the selected next observation vector and each selected landmark observation vector of set of landmark observation vectors $X_l$ is computed in the projected subspace of operation 824.

Similar to operation 250, in an operation 926, an average distance between the selected next observation vector and each landmark is computed, for example, using $D_{mean}=(\Sigma_{i=1}^{N_l} D(o,i))/N_l$.

Similar to operation 252, in an operation 928, the number of nearest landmark observation vectors $N_{nl}$ is selected from the set of landmark observation vectors $X_l=[x_{l1}, x_{l2}, \ldots, x_{lN_l}]$ based on having the $N_{nl}$ minimum distance values stored in $D(o,i), i=1, \ldots, N_l$ to define a set of nearest landmark observation vectors $X_{nl}=[x_{nl1}, x_{nl2}, \ldots, x_{nlN_{nl}}]$.

Similar to operation 253, in an operation 930, the next nearest landmark observation vector is selected from the set of nearest landmark observation vectors $X_{nl}=[x_{nl1}, x_{nl2}, \ldots, x_{nlN_{nl}}]$.

Similar to operation 254, in an operation 932, a landmark distance value is computed for the nearest landmark observation vector index $k=I_{nl}[j]$, for example, using $D_k=\max(D_{mean}-D(o,k), reg_p*D_{mean})$.

Similar to operation 256, in an operation 934, the computed landmark distance value is added to the feature distance matrix $F[o,k+(t-1)N_l]=D_k$.

Similar to operation 258, in an operation 936, a determination is made concerning whether there is another nearest landmark observation vector of the set of nearest landmark observation vectors $X_{nl}=[x_{nl1}, x_{nl2}, \ldots, x_{nlN_{nl}}]$ to process. When $j \leq N_{nl}$, processing continues in operation 930 to select the next nearest landmark observation vector after incrementing $j=j+1$. When $j>N_{nl}$, processing continues in an operation 938.

Similar to operation 260, in operation 938, a determination is made concerning whether there is another observation vector of the set of observation vectors X to process. When $o \leq N$, processing continues in operation 922 to select a next observation vector after incrementing $o=o+1$ and reinitializing the nearest landmark observation vector index $j=1$. When $o>N$, processing continues in an operation 940.

Referring to FIG. 9B, similar to operation 262, in operation 940, a determination is made concerning whether there is another iteration to process. When $t \leq T$, processing continues in an operation 942. When $t>T$, processing continues in an operation 946.

Similar to operation 264, in operation 942, the iteration number t is incremented, and the nearest landmark observation vector index j and the observation vector index o are reinitialized, for example, using $t=t+1$, $j=1$, and $o=1$, respectively, and processing continues in operation 922.

Similar to operation 266, in operation 944, the twelfth indicator indicates the model type.

Similar to operation 268, in an operation 946, the thirteenth indicator of one or more hyperparameters to use for training and validating the indicated model type are received.

Similar to operation 270, in an operation 948, the fourteenth indicator may be received that indicates a plurality of input variables to include in the model training process from training dataset 124 and/or feature distance data 126.

Similar to operation 272, in an operation 950, the fifteenth indicator may be received that indicates model description data 130.

Similar to operation 274, in an operation 952, the model is trained using each observation vector read from training dataset 124 and/or feature distance data 126 based on the model type selected in operation 944, the hyperparameters selected in operations 946, and the input variables selected in operations 948.

Similar to operation 276, in an operation 954, the data that describes the trained model is stored in model description data 130.

An existing feature engineering algorithm (referred to herein as RandLocal) was introduced by Suhang Wang, Charu Aggarwal, and Huan Liu in the paper *Randomized Feature Engineering As a Fast and Accurate Alternative to Kernel Methods* published In Proceedings of the 23rd ACM SIGKDD International Conference on Knowledge Discovery and Data Mining (KDD '17), ACM, New York, N.Y., USA, 485-494 (2017). RandLocal is the second variant of feature generation application 122 with $N_{nl}=1$.

Seven datasets were used to compare results generated by models trained with the raw features of each dataset, with the features generated by feature generation application 122 (referred to as RULLS with either PCA or ROBPCA as the selected principal components algorithm), with the features generated by the first variant of feature generation application 122 (referred to as Variant I), with the features generated by the second variant of feature generation application 122 (referred to as Variant II), and with the features generated by RandLocal. The statistics of these datasets are shown in Table 1 below. All of the datasets are from either OpenML (Joaquin Vanschoren, Jan N. van Rijn, Bernd Bischl, and Luis Torgo, *OpenML: Networked Science in Machine Learning*, SIGKDD Explorations 15 2 49-60 (2013).) or from the UCI repository (M. Lichman, UCI Machine Learning Repository (2013).).

TABLE 1

| Dataset | Japanese Vowel | Fashion MNIST | Baseball | Breast Cancer | Digits | IRIS | Anuran Calls |
|---|---|---|---|---|---|---|---|
| Instances | 9960 | 70000 | 1340 | 569 | 10992 | 150 | 7195 |
| # Features | 15 | 784 | 18 | 32 | 16 | 4 | 22 |
| # Classes | 9 | 10 | 3 | 2 | 10 | 3 | 4 |
| Missing | — | — | 20 | — | — | — | — |

The datasets were randomly divided into training (80%) and test (20%) datasets. 10-fold cross validation was performed and the average results were reported in the results presented herein. For clustering and classification tasks, results were reported for $T=100$ for all methods. For feature generation application 122, neighbor distance value $\varepsilon$ was selected such that the number of neighbor observation vectors $N_n=30$, the number of landmark observation vectors $N_l=122$, the number of nearest landmark observation vectors $N_{nl}=10$ except for RandLocal in which $N_{nl}=1$, and the regularization parameter $reg_p=0.0001$. The number of features for RandLocal, Variant I, and Variant II was set to $d=0.2$ m, where m is the number of features included in each dataset.

Figure 10:
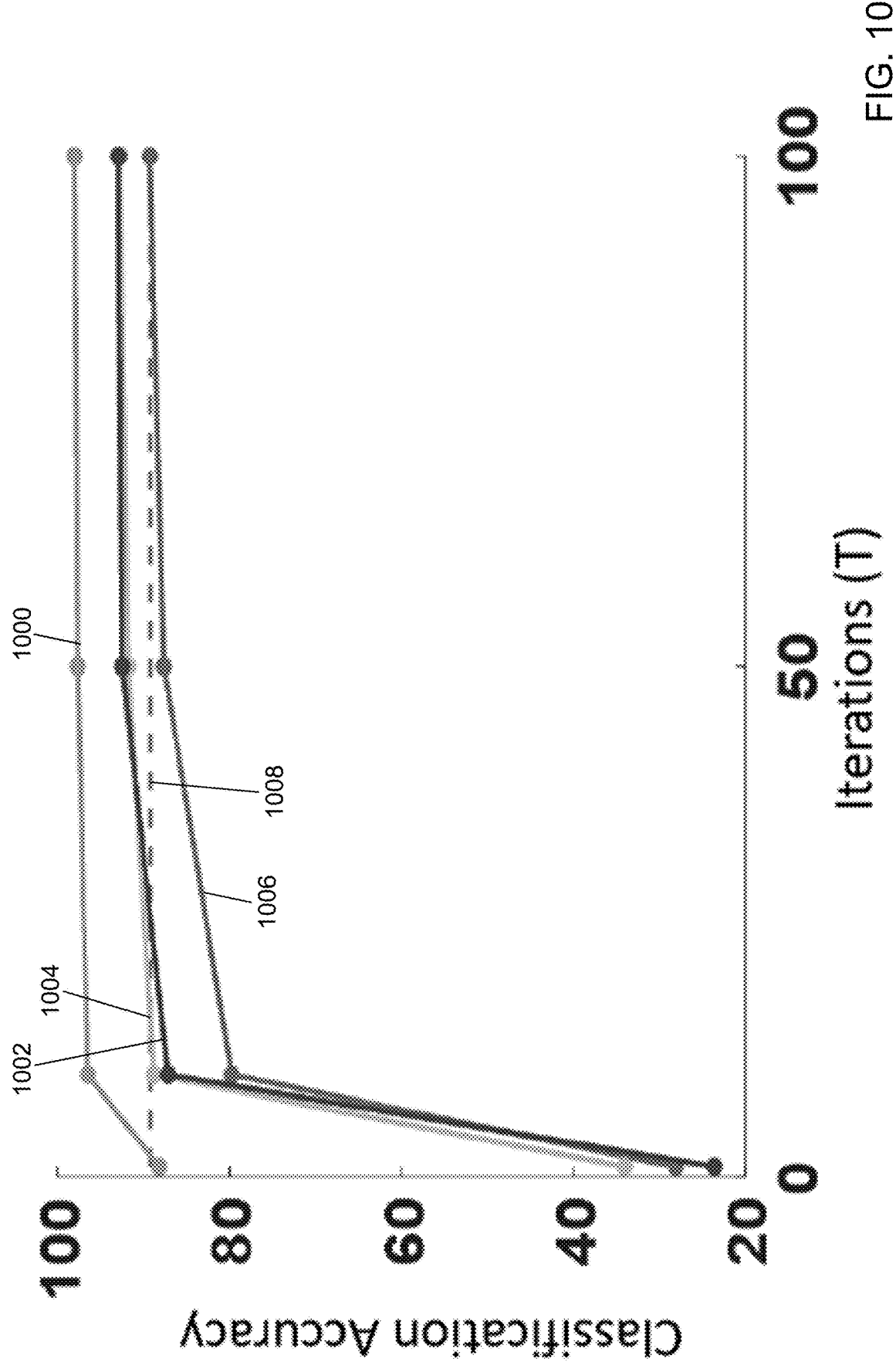
FIG. 10 depicts a comparison of an average classification accuracy as a function of features and a number of iterations selected for classifying observations of a Japanese Vowel dataset in accordance with an illustrative embodiment.

A classification task was performed using a linear Support Vector Machine (SVM) classifier. Referring to FIG. 10, a classification accuracy performance is shown for comparison using the Japanese Vowel dataset as a function of the number of iterations $T=1, 10, 50,$ and $100$. The principal components algorithm selected for feature generation application 122 was regular PCA. A first curve 1000 shows the classification accuracy performance using feature generation application 122. A second curve 1002 shows the classification accuracy performance using features generated by the first variant of feature generation application 122. A third curve 1004 shows the classification accuracy performance using features generated by the second variant of feature generation application 122. A fourth curve 1006 shows the classification accuracy performance using features generated by RandLocal. A fifth curve 1008 shows the classification accuracy performance using the raw features.

Figure 11:
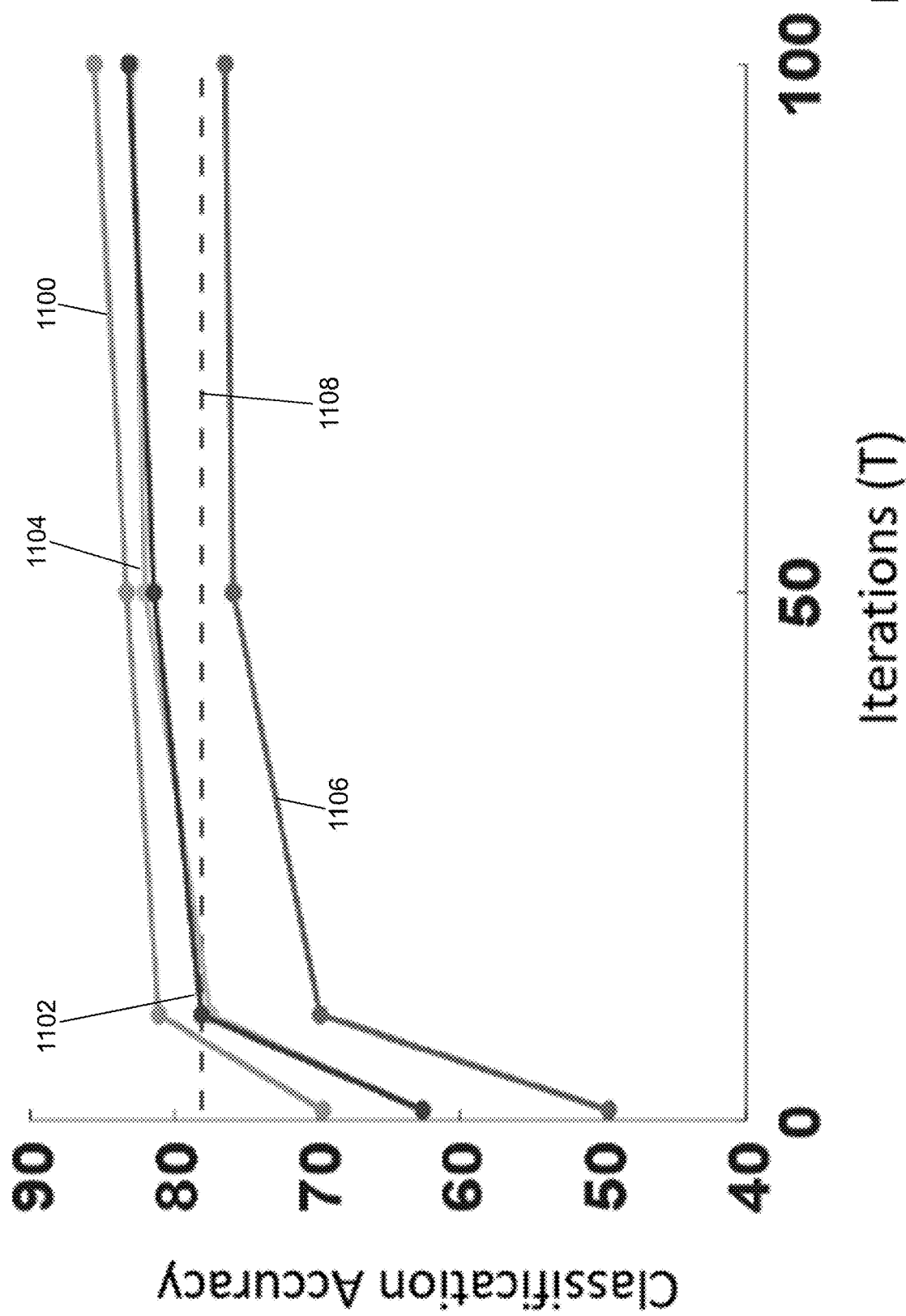
FIG. 11 depicts a comparison of an average classification accuracy as a function of features and a number of iterations selected for classifying observations of a Fashion MNIST dataset in accordance with an illustrative embodiment.

Referring to FIG. 11, a classification accuracy performance is shown for comparison using the Fashion MNIST dataset (Han Xiao, Kashif Rasul, and Roland Vollgraf,

*Fashion-MNIST: a Novel Image Dataset for Benchmarking Machine Learning Algorithms* (2017).) as a function of the number of iterations T=1, 10, 50, and 100. The principal components algorithm selected for feature generation application 122 was regular PCA. A first curve 1100 shows the classification accuracy performance using feature generation application 122. A second curve 1102 shows the classification accuracy performance using features generated by the first variant of feature generation application 122. A third curve 1104 shows the classification accuracy performance using features generated by the second variant of feature generation application 122. A fourth curve 1106 shows the classification accuracy performance using features generated by RandLocal. A fifth curve 1108 shows the classification accuracy performance using the raw features.

Figure 12:
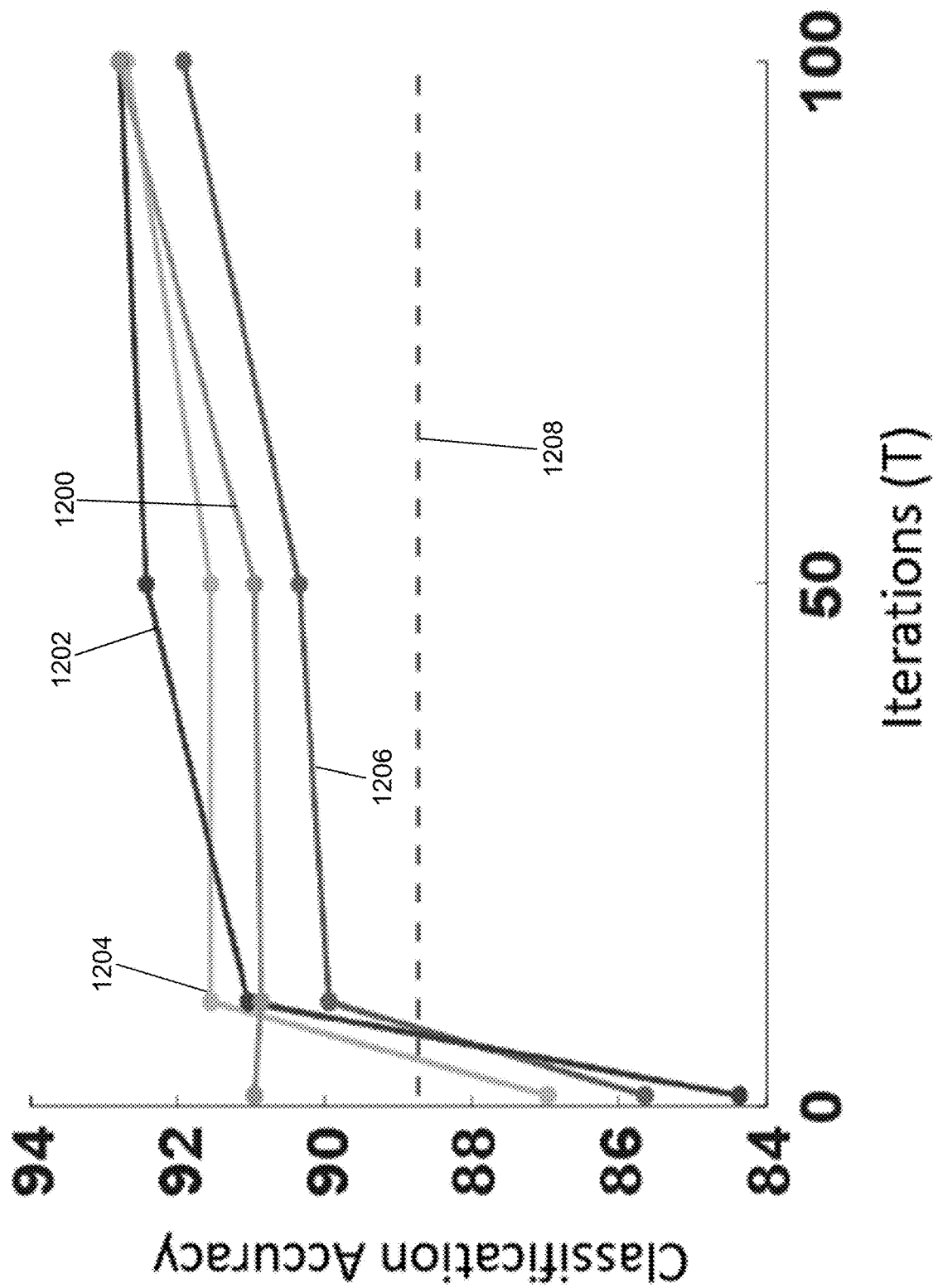
FIG. 12 depicts a comparison of an average classification accuracy as a function of features and a number of iterations selected for classifying observations of a Breast Cancer dataset in accordance with an illustrative embodiment.

Referring to FIG. 12, a classification accuracy performance is shown for comparison using the Breast Cancer dataset as a function of the number of iterations T=1, 10, 50, and 100. The principal components algorithm selected for feature generation application 122 was regular PCA. A first curve 1200 shows the classification accuracy performance using feature generation application 122. A second curve 1202 shows the classification accuracy performance using features generated by the first variant of feature generation application 122. A third curve 1204 shows the classification accuracy performance using features generated by the second variant of feature generation application 122. A fourth curve 1206 shows the classification accuracy performance using features generated by RandLocal. A fifth curve 1208 shows the classification accuracy performance using the raw features.

Figure 13:
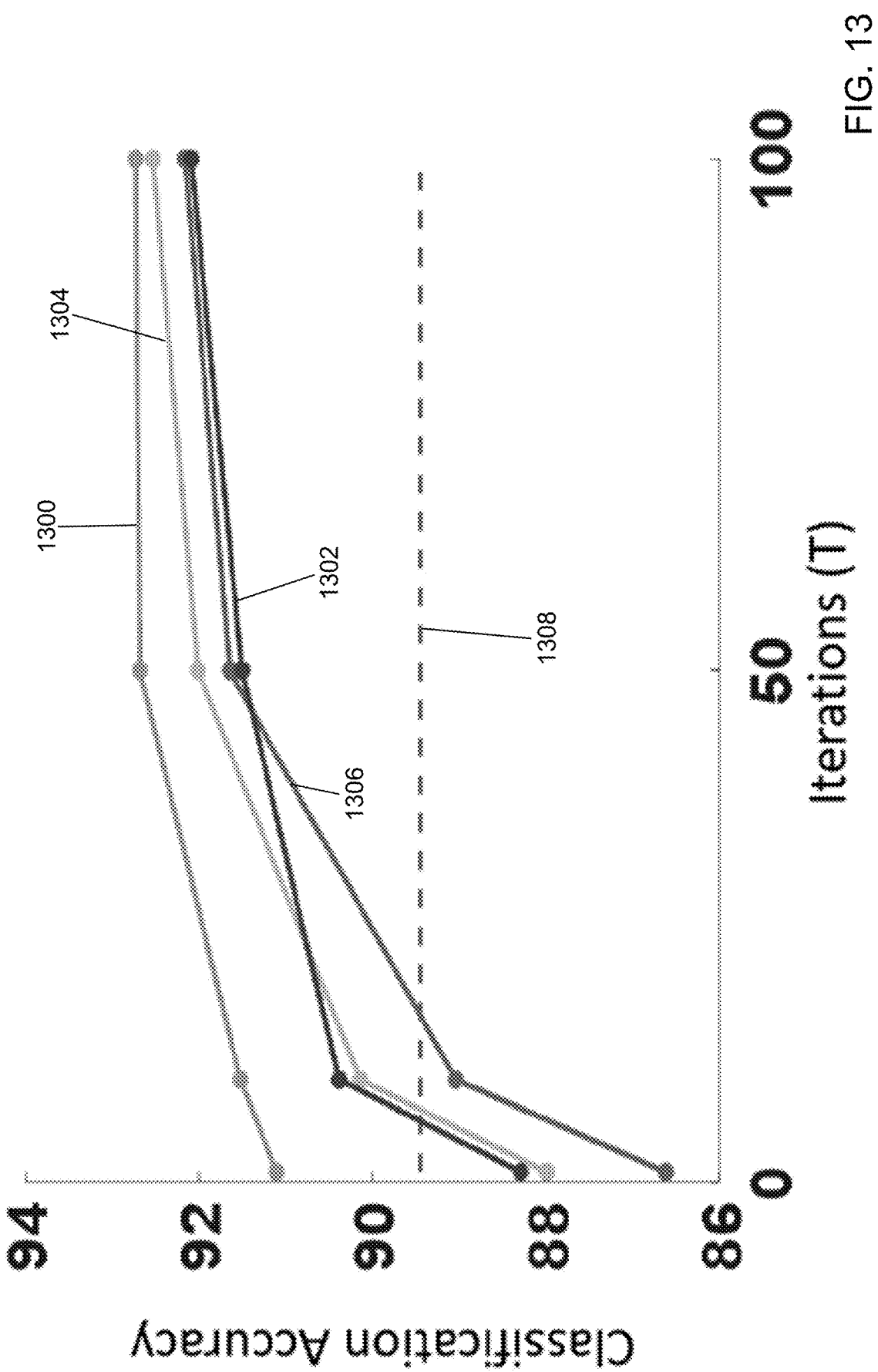
FIG. 13 depicts a comparison of an average classification accuracy as a function of features and a number of iterations selected for classifying observations of a Baseball dataset in accordance with an illustrative embodiment.

Referring to FIG. 13, a classification accuracy performance is shown for comparison using the Baseball dataset (Jeffrey S Simonoff, *Analyzing categorical data*, Springer Science & Business Media (2013).) as a function of the number of iterations T=1, 10, 50, and 100. The principal components algorithm selected for feature generation application 122 was regular PCA. A first curve 1300 shows the classification accuracy performance using feature generation application 122. A second curve 1302 shows the classification accuracy performance using features generated by the first variant of feature generation application 122. A third curve 1304 shows the classification accuracy performance using features generated by the second variant of feature generation application 122. A fourth curve 1306 shows the classification accuracy performance using features generated by RandLocal. A fifth curve 1308 shows the classification accuracy performance using the raw features.

Figure 14:
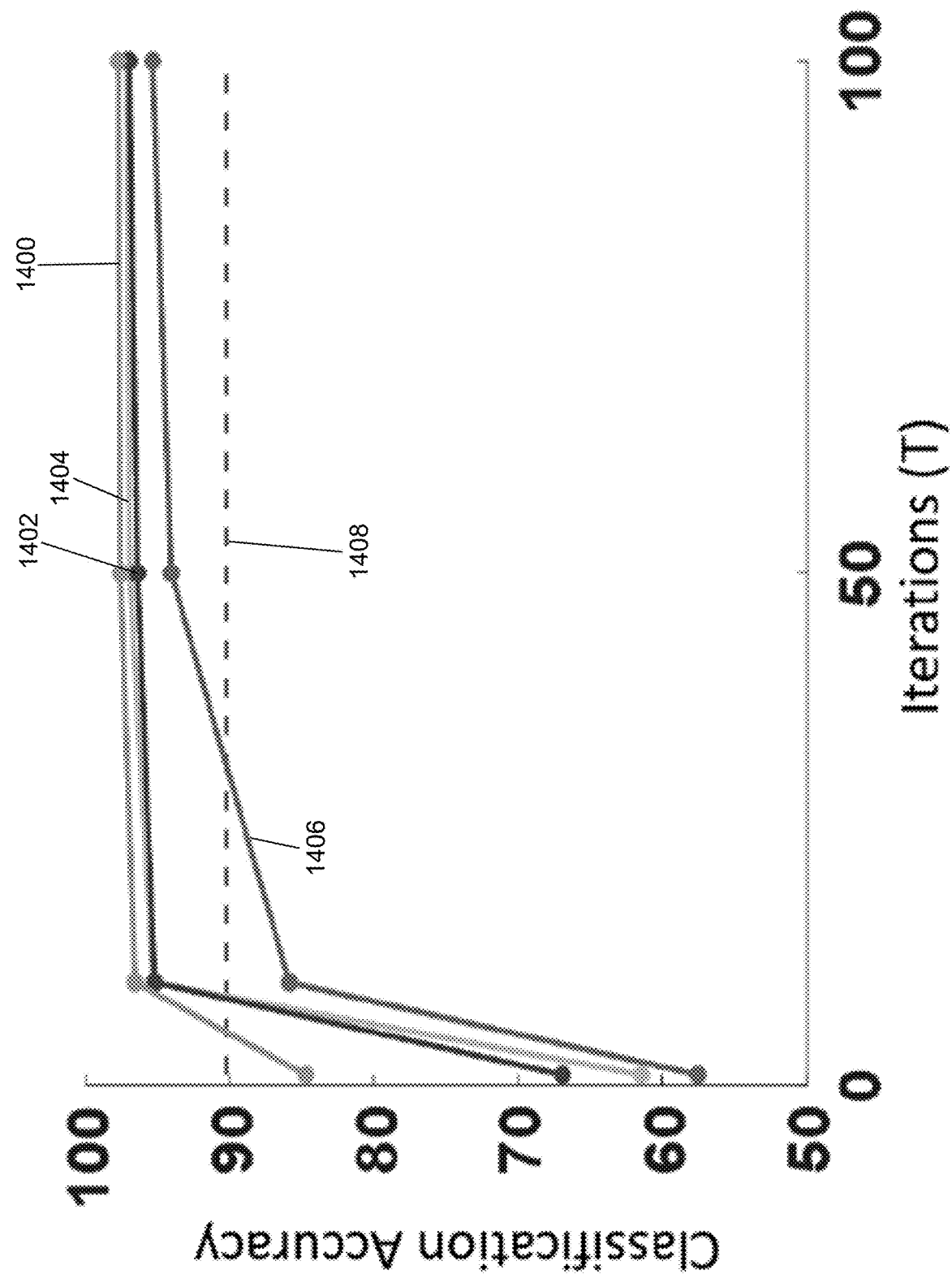
FIG. 14 depicts a comparison of an average classification accuracy as a function of features and a number of iterations selected for classifying observations of a Digits dataset in accordance with an illustrative embodiment.

Referring to FIG. 14, a classification accuracy performance is shown for comparison using the Digits dataset as a function of the number of iterations T=1, 10, 50, and 100. The principal components algorithm selected for feature generation application 122 was regular PCA. A first curve 1400 shows the classification accuracy performance using feature generation application 122. A second curve 1402 shows the classification accuracy performance using features generated by the first variant of feature generation application 122. A third curve 1404 shows the classification accuracy performance using features generated by the second variant of feature generation application 122. A fourth curve 1406 shows the classification accuracy performance using features generated by RandLocal. A fifth curve 1408 shows the classification accuracy performance using the raw features.

The difference in classification accuracy between T=50 and T=100 was very small for all methods indicating that adding features beyond this point results in a very small improvement in performance.

Figure 15:
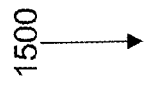
FIG. 15 provides a first accuracy comparison table in accordance with an illustrative embodiment.

Referring to FIG. 15, a first table 1500 shows a significant improvement using feature generation application 122 compared to the raw features, specifically, 8% for the Japanese Vowel dataset, 7.84% for the Fashion MNIST dataset, 4.08% for the Breast Cancer dataset, 3.28% for the Baseball dataset, and 7.41% for the Digits dataset. For all the datasets, feature generation application 122 performed better than the other methods. Feature generation application 122 performed better than the existing RandLocal by 8.73% for the Japanese Vowel dataset, 9.11% for the Fashion MNIST dataset, 0.88% for the Breast Cancer dataset, 0.12% for the Baseball dataset, and 2.28% for the Digits dataset. Variant I and Variant II also performed better than RandLocal for all datasets.

To test the robustness in the presence of noise, the data was corrupted in 10% of the features (columns) in each dataset, and the data was corrupted in 10% of the observations (rows) in each dataset by adding uniform random noise. Referring to FIG. 16, a second table 1600 shows the classification performance for both noise cases. The numbers in the parenthesis indicate the difference between the performance with and without noise. There was a drop in the performance for all methods in the presence of noise. Consistent results were observed for all datasets except for the Breast Cancer dataset. For the Breast Cancer dataset, Variant II performed the best in the presence of both types of noise.

As another comparison point, feature generation application 122 was executed with robust PCA instead of regular PCA. Referring to FIG. 17, a third table 1700 shows the classification performance using feature generation application 122 with robust PCA (RULLS with ROBPCA). The raw features showed a slightly lower performance than RULLS with PCA indicating that the raw features do not have outliers. RULLS with ROBPCA showed improved performance when the rows of the dataset were corrupted by noise. This is expected because adding noise to rows simulates the effect of having outliers. A 3.16% improvement was seen relative to RULLS with regular PCA, which even beats RULLS with ROBPCA on the raw features indicating that RULLS with ROBPCA was able to deal with outliers (noise) better than using PCA. RULLS with robust PCA performed better than Variant II in the case of noise added to the rows.

For the case when noise was added to the columns, use of RULLS with ROBPCA did not result in an improvement, which is expected since ROBPCA works well by reducing the effect of the outliers. In the noised column case, the description of the data points is changed, which is different from adding noise (outliers) in the row case.

Figure 18:
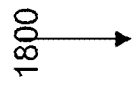
FIG. 18 provides a fourth accuracy comparison table in accordance with an illustrative embodiment.
Figure 19:
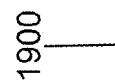
FIG. 19 provides a fifth accuracy comparison table in accordance with an illustrative embodiment.

For a clustering task, a k-means clustering algorithm was trained to compare the feature generation performance. Referring to FIG. 18, a fourth table 1800 shows an average normalized mutual information (NMI) value for each dataset as a measure of performance. RULLS performed the best for the Anuran Calls and the Baseball datasets. For the Iris dataset, Variant II performed the best. Referring to FIG. 19, a fifth table 1900 shows the clustering performance using feature generation application 122 with robust PCA (RULLS with ROBPCA). In the case of the IRIS dataset, feature generation application 122 with robust PCA resulted in an improvement of 2.59% making it comparable to Variant I and Variant II.

Figure 20:
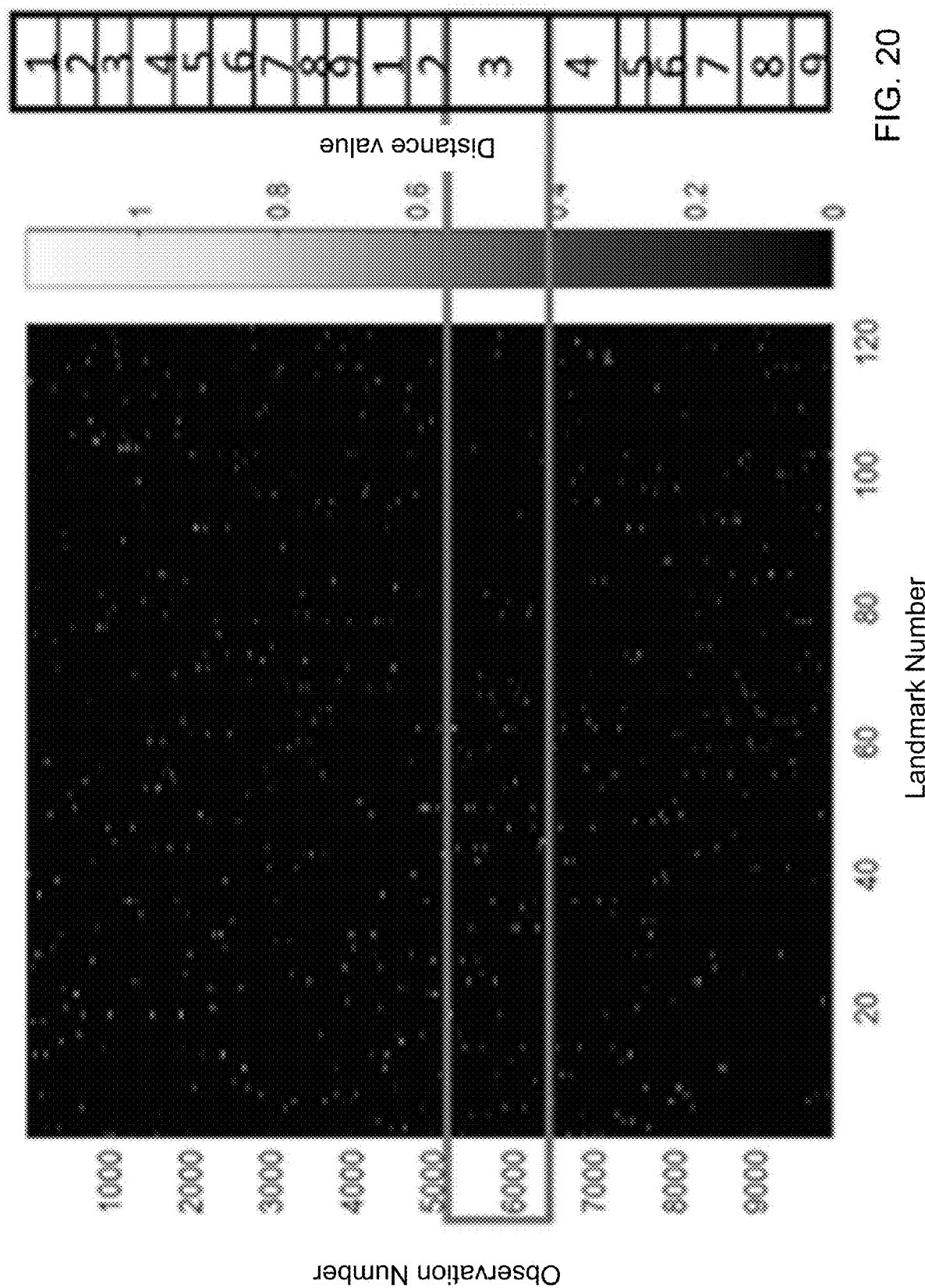
FIG. 20 provides a first visual interpretation of features using an existing algorithm in accordance with an illustrative embodiment (color).
Figure 21:
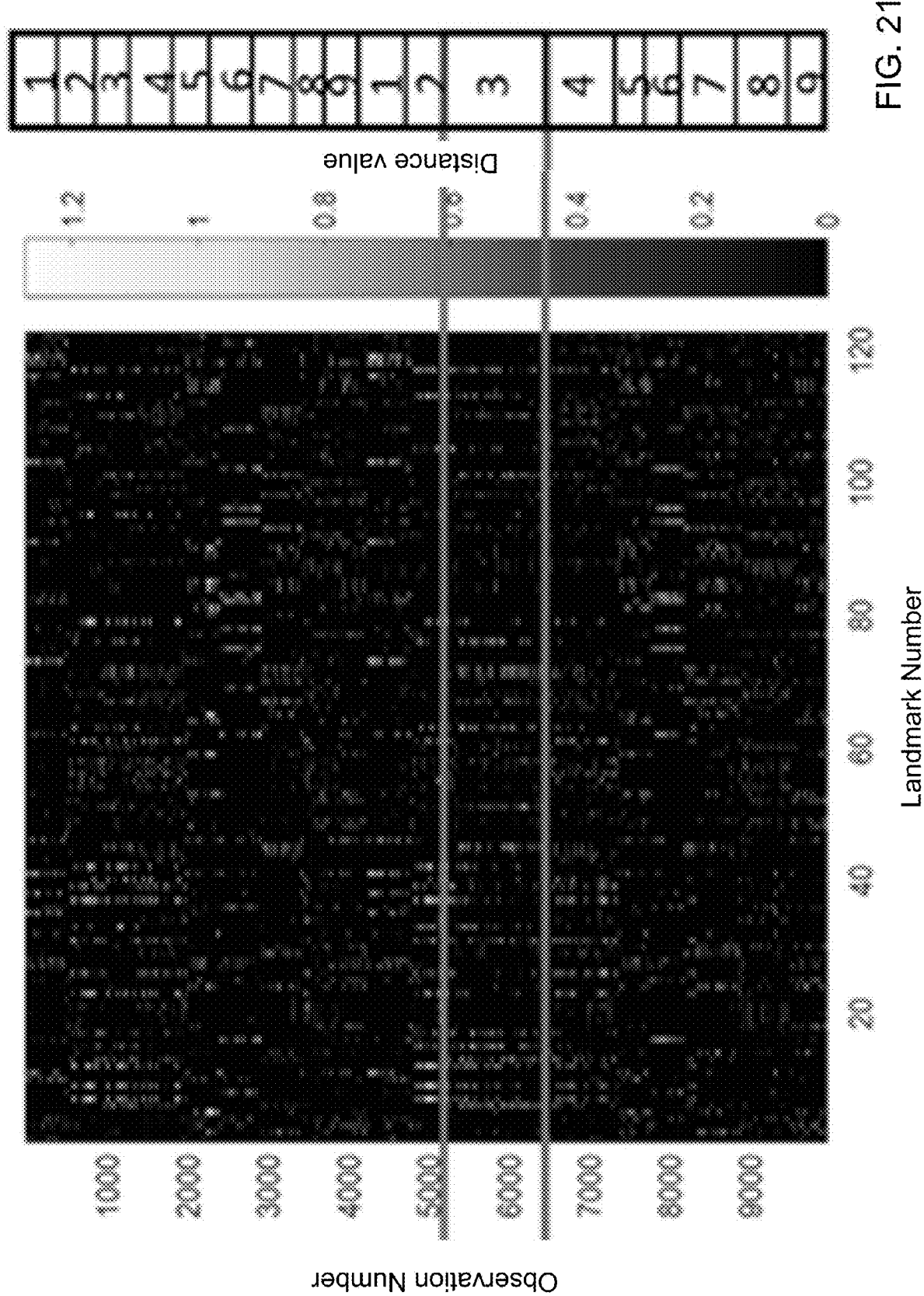
FIG. 21 provides a second visual interpretation of features using the feature generation application of FIGS. 9A and 9B in accordance with an illustrative embodiment (color).
Figure 22:
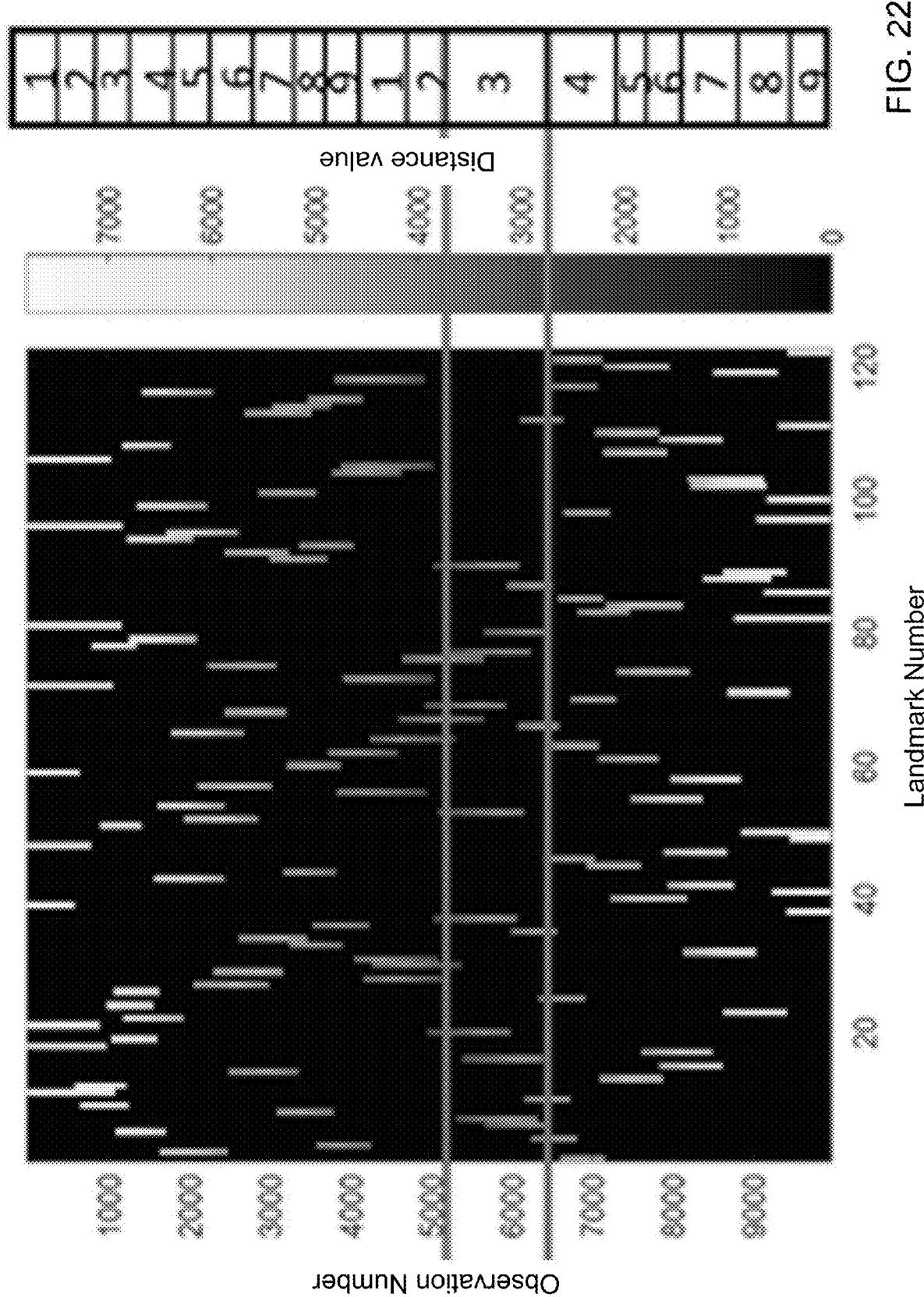
FIG. 22 provides a third visual interpretation of features using the feature generation application of FIGS. 8A and 8B in accordance with an illustrative embodiment (color).
Figure 23:
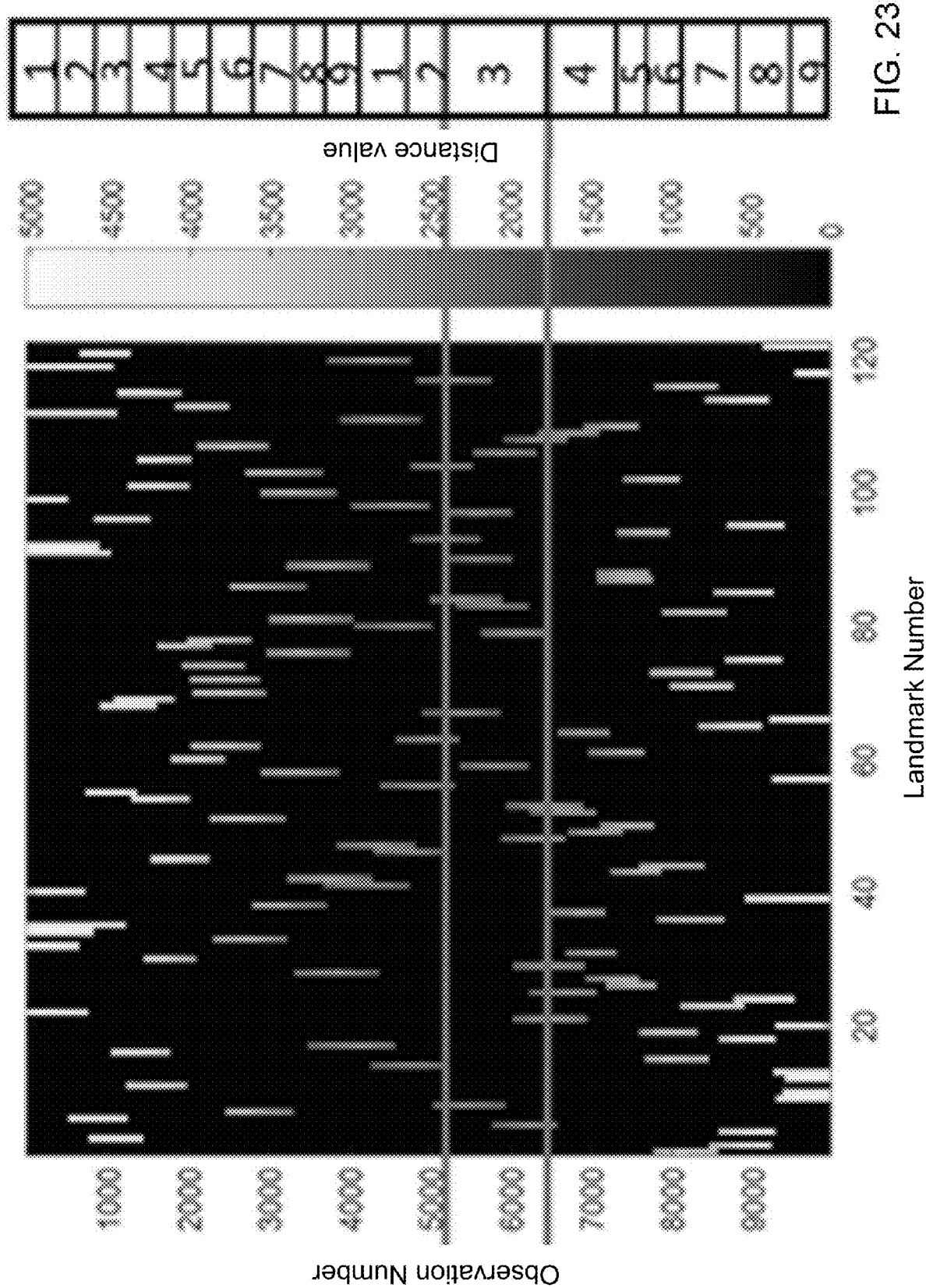
FIG. 23 provides a fourth visual interpretation of features using the feature generation application of FIGS. 2A, 2B, and 2C in accordance with an illustrative embodiment (color).

Referring to FIG. 20, the features generated by RandLocal with the Japanese Vowel dataset are shown. Referring to FIG. 21, the features generated by the second variant of feature generation application 122 with the Japanese Vowel dataset are shown. Referring to FIG. 22, the features generated by the first variant of feature generation application 122 with the Japanese Vowel dataset are shown. Referring to FIG. 23, the features generated by feature generation application 122 with the Japanese Vowel dataset are shown. The parameters used were the number of iterations T=1, neighbor distance value E was selected such that the number of neighbor observation vectors $N_n$=30, the number of landmark observation vectors $N_l$=122, the number of nearest landmark observation vectors $N_{nl}$=10 except for RandLocal in which $N_{nl}$=1, the regularization parameter $reg_p$=0.0001. The number of features for RandLocal, Variant I, and Variant II was set to d=0.2 m, where m is the number of features included in the dataset.

The segment highlighted in each of FIGS. 20 to 23 belongs to a single class (class label=3). Referring to FIG. 20, the feature matrix is very sparse with a sparsity ratio of SR=0.0081. The points belonging to the same class do not have the same neighbors possibly due to assigning each data point to only one nearest landmark. Referring to FIG. 21, the effect of assigning a data point to multiple landmarks can be seen. The feature matrix is less sparse (SR=0.0819) than that shown in FIG. 20, however, the image appears noisy. Referring to FIGS. 22 and 23, the feature matrices include refined patterns that are less noisy particularly in the highlighted segments in which the data points belonging to the same class show solid vertical lines indicating that they picked the same landmarks (neighbors). The range of distances in FIGS. 22 and 23 are in the projected space. Similar patterns are seen for points belonging to the same class in these two images which suggests good predictive power. The feature matrix is less sparse (SR=0.0819) for both FIG. 22 and FIG. 23 as well. The results suggest that there is a trade-off between predictive power and sparsity.

The success of machine learning models depends heavily on the features that are input to train a model. Feature generation application 122 provides an unsupervised method that generates robust features that are sparse and fast to compute. The raw features are projected to local subspaces by choosing the most descriptive variables in the local neighborhoods, which has an added advantage over choosing features randomly. By choosing the features using local neighborhoods, a better performance is achieved with fewer iterations using feature generation application 122 meaning feature generation application 122 is an improvement to machine learning. The performance using the features generated by feature generation application 122 for classification were further shown to be robust to noise.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:

read a dataset that includes a plurality of observation vectors, wherein each observation vector of the plurality of observation vectors includes a plurality of variable values, wherein each variable value is associated with a variable of a plurality of variables;

(a) randomly select a plurality of landmark observation vectors from the plurality of observation vectors, wherein a predefined number of landmark observation vectors is randomly selected;

(b) select a landmark observation vector from the selected plurality of landmark observation vectors;

(c) randomly select a plurality of neighbor observation vectors that are less than a predefined distance from the selected landmark observation vector, wherein a predefined number of neighbor observation vectors is randomly selected;

(d) compute a plurality of principal components for the selected plurality of neighbor observation vectors to define a neighborhood subspace;

(e) project the plurality of observation vectors into the defined neighborhood subspace;

(f) compute a distance vector that includes a distance value computed between the selected landmark observation vector and each observation vector of the projected plurality of observation vectors;

(g) add the computed distance vector to a distance matrix;

(h) repeat (c) to (g) with a next landmark observation vector selected from the selected plurality of landmark observation vectors as the selected landmark observation vector until each of the predefined number of landmark observation vectors is selected;

(i) select an observation vector from the plurality of observation vectors;

(j) select a plurality of nearest landmark observation vectors from the selected plurality of landmark observation vectors for the selected observation vector, wherein a predefined number of the plurality of nearest landmark observation vectors is selected based on minimum distances identified in the distance matrix for the selected observation vector;

(k) compute a second distance vector that includes a second distance value computed between the selected observation vector and each landmark observation vector, wherein the second distance value is zero for each landmark observation vector not included in the selected plurality of nearest landmark observation vectors;

(l) add the computed second distance vector to a feature distance matrix;

(m) repeat (j) to (l) with a next observation vector selected from the plurality of observation vectors as the selected observation vector until each observation vector of the plurality of observation vectors is selected;

train a machine learning model using the feature distance matrix that defines a sparse feature representation of the plurality of observation vectors using each second distance value instead of each variable value of the plurality of variables to reduce a dimension and a correlation between each variable value of the plurality of variables to achieve a classification accuracy of the machine learning model in fewer iterations; and store the trained machine learning model for classifying a second observation vector included in a second dataset.

2. The non-transitory computer-readable medium of claim 1, wherein the feature distance matrix has a dimension (N, $N_l$), where N is a number of the plurality of observation vectors, and $N_l$ is the predefined number of landmark observation vectors.

3. The non-transitory computer-readable medium of claim 1, wherein the machine learning model is a classification model that is selected from the group consisting of a decision tree model, a factorization machine model, a forest model, a gradient boosting tree model, a neural network model, a support vector machine model, a clustering model, and a regression model.

4. The non-transitory computer-readable medium of claim 1, wherein the machine learning model is further trained using the plurality of observation vectors.

5. The non-transitory computer-readable medium of claim 1, wherein (a) to (m) is repeated a predefined number of iterations before training the machine learning model.

6. The non-transitory computer-readable medium of claim 5, wherein the feature distance matrix has a dimension (N, $T*N_l$), where N is a number of the plurality of observation vectors, T is the predefined number of iterations, and $N_l$ is the predefined number of landmark observation vectors.

7. The non-transitory computer-readable medium of claim 1, wherein the predefined number of landmark observation vectors is computed based on a number of observations of the plurality of observation vectors.

8. The non-transitory computer-readable medium of claim 1, wherein the predefined number of nearest landmark observation vectors is greater than one and less than the predefined number of landmark observation vectors.

9. The non-transitory computer-readable medium of claim 1, wherein the predefined number of neighbor observation vectors is between 10 and 30.

10. The non-transitory computer-readable medium of claim 1, wherein the second distance value is computed for the selected observation vector o of the plurality of observation vectors and for a nearest landmark observation vector j using $D_j = \max(D_{mean} - D(o,j), reg_p * D_{mean})$, where $D_{mean}$ is an average distance computed between the selected observation vector and each landmark observation vector of the selected plurality of landmark observation vectors, D(o, j) is the distance value computed between the selected observation vector o and the nearest landmark observation vector j, and $reg_p$ is a predefined regularization parameter.

11. The non-transitory computer-readable medium of claim 10, wherein the distance value is a Euclidian distance value.

12. The non-transitory computer-readable medium of claim 1, wherein the computer-readable instructions further cause the computing device to:

read the second observation vector from the second dataset;

instantiate a classification model from the stored, trained machine learning model;

compute a predicted characteristic of the read second observation vector using the instantiated classification model; and output the computed predicted characteristic of the read second observation vector.

13. The non-transitory computer-readable medium of claim 12, wherein the predicted characteristic indicates that the read second observation vector is an outlier relative to the plurality of observation vectors read from the dataset.

14. The non-transitory computer-readable medium of claim 12, wherein the predicted characteristic is a classification of the read second observation vector based on the plurality of observation vectors read from the dataset.

15. The non-transitory computer-readable medium of claim 12, wherein before computing the predicted characteristic of the read second observation vector, an additional feature is computed for the read second observation vector using the computed plurality of principal components.

16. The non-transitory computer-readable medium of claim 1, wherein computing the plurality of principal components comprises:

computing a covariance matrix from the selected plurality of neighbor observation vectors;

computing eigenvalues and eigenvectors from the computed covariance matrix; and selecting a plurality of eigenvectors required to reach a predefined variance value, wherein the plurality of eigenvectors is the plurality of principal components.

17. The non-transitory computer-readable medium of claim 1, wherein after (c) and before (d) the computer-readable instructions further cause the computing device to:

normalize the selected plurality of neighbor observation vectors so that each dimension of each neighbor observation vector of the selected plurality of neighbor observation vectors has a value between zero and one based on a maximum value and a minimum value of the selected plurality of neighbor observation vectors in each dimension, wherein the normalized neighbor observation vectors are the selected plurality of neighbor observation vectors in (d).

18. The non-transitory computer-readable medium of claim 17, wherein after (c) and before (d) the computer-readable instructions further cause the computing device to:

normalize the plurality of observation vectors with respect to a neighborhood's subspace defined from the normalized selected plurality of neighbor observation vectors, wherein the normalized plurality of observation vectors are the plurality of observation vectors projected in (e).

19. A computing device comprising:

a processor; and a non-transitory computer-readable medium operably coupled to the processor, the computer-readable medium having computer-readable instructions stored thereon that, when executed by the processor, cause the computing device to read a dataset that includes a plurality of observation vectors, wherein each observation vector of the plurality of observation vectors includes a plurality of variable values, wherein each variable value is associated with a variable of a plurality of variables;

(a) randomly select a plurality of landmark observation vectors from the plurality of observation vectors, wherein a predefined number of landmark observation vectors is randomly selected;

(b) select a landmark observation vector from the selected plurality of landmark observation vectors;

(c) randomly select a plurality of neighbor observation vectors that are less than a predefined distance from the selected landmark observation vector, wherein a predefined number of neighbor observation vectors is randomly selected;

(d) compute a plurality of principal components for the selected plurality of neighbor observation vectors to define a neighborhood subspace;

(e) project the plurality of observation vectors into the defined neighborhood subspace;
(f) compute a distance vector that includes a distance value computed between the selected landmark observation vector and each observation vector of the projected plurality of observation vectors;
(g) add the computed distance vector to a distance matrix;
(h) repeat (c) to (g) with a next landmark observation vector selected from the plurality of landmark observation vectors as the selected landmark observation vector until each of the predefined number of landmark observation vectors is selected;
(i) select an observation vector from the plurality of observation vectors;
(j) select a plurality of nearest landmark observation vectors from the selected plurality of landmark observation vectors for the selected observation vector, wherein a predefined number of the plurality of nearest landmark observation vectors is selected based on minimum distances identified in the distance matrix for the selected observation vector;
(k) compute a second distance vector that includes a second distance value computed between the selected observation vector and each landmark observation vector, wherein the second distance value is zero for each landmark observation vector not included in the selected plurality of nearest landmark observation vectors;
(l) add the computed second distance vector to a feature distance matrix;
(m) repeat (j) to (l) with a next observation vector selected from the plurality of observation vectors as the selected observation vector until each observation vector of the plurality of observation vectors is selected;
train a machine learning model using the feature distance matrix that defines a sparse feature representation of the plurality of observation vectors using each second distance value instead of each variable value of the plurality of variables to reduce a dimension and a correlation between each variable value of the plurality of variables to achieve a classification accuracy of the machine learning model in fewer iterations; and
store the trained machine learning model for classifying a second observation vector included in a second dataset.

20. A method for determining a sparse feature representation for a machine learning model to support model improvement, the method comprising:
reading, by a computing device, a dataset that includes a plurality of observation vectors, wherein each observation vector of the plurality of observation vectors includes a plurality of variable values, wherein each variable value is associated with a variable of a plurality of variables;
(a) randomly selecting, by the computing device, a plurality of landmark observation vectors from the plurality of observation vectors, wherein a predefined number of landmark observation vectors is randomly selected;
(b) selecting, by the computing device, a landmark observation vector from the selected plurality of landmark observation vectors;
(c) randomly selecting, by the computing device, a plurality of neighbor observation vectors that are less than a predefined distance from the selected landmark observation vector, wherein a predefined number of neighbor observation vectors is randomly selected;
(d) computing, by the computing device, a plurality of principal components for the selected plurality of neighbor observation vectors to define a neighborhood subspace;
(e) projecting, by the computing device, the plurality of observation vectors into the defined neighborhood subspace;
(f) computing, by the computing device, a distance vector that includes a distance value computed between the selected landmark observation vector and each observation vector of the projected plurality of observation vectors;
(g) adding, by the computing device, the computed distance vector to a distance matrix;
(h) repeating, by the computing device, (c) to (g) with a next landmark observation vector selected from the selected plurality of landmark observation vectors as the selected landmark observation vector until each of the predefined number of landmark observation vectors is selected;
(i) selecting, by the computing device, an observation vector from the plurality of observation vectors;
(j) selecting, by the computing device, a plurality of nearest landmark observation vectors from the selected plurality of landmark observation vectors for the selected observation vector, wherein a predefined number of the plurality of nearest landmark observation vectors is selected based on minimum distances identified in the distance matrix for the selected observation vector;
(k) computing, by the computing device, a second distance vector that includes a second distance value computed between the selected observation vector and each landmark observation vector, wherein the second distance value is zero for each landmark observation vector not included in the selected plurality of nearest landmark observation vectors;
(l) adding, by the computing device, the computed second distance vector to a feature distance matrix;
(m) repeating, by the computing device, (j) to (l) with a next observation vector selected from the plurality of observation vectors as the selected observation vector until each observation vector of the plurality of observation vectors is selected;
training, by the computing device, the machine learning model using the feature distance matrix that defines the sparse feature representation of the plurality of observation vectors using each second distance value instead of each variable value of the plurality of variables to reduce a dimension and a correlation between each variable value of the plurality of variables to achieve a classification accuracy of the machine learning model in fewer iterations; and
storing, by the computing device, the trained machine learning model for classifying a second observation vector included in a second dataset.

21. The method of claim 20, wherein (a) to (m) is repeated a predefined number of iterations before training the machine learning model.

22. The method of claim 21, wherein the feature distance matrix has a dimension $(N, T*N_l)$, where N is a number of the plurality of observation vectors, T is the predefined number of iterations, and $N_l$ is the predefined number of landmark observation vectors.

23. The method of claim 20, wherein the predefined number of landmark observation vectors is computed based on a number of observations of the plurality of observation vectors.

24. The method of claim 20, wherein the predefined number of nearest landmark observation vectors is greater than one and less than the predefined number of landmark observation vectors.

25. The method of claim 20, wherein the second distance value is computed for the selected observation vector o of the plurality of observation vectors and for a nearest landmark observation vector j using $D_j=\max(D_{mean}-D(o, j), reg_p*D_{mean})$, where $D_{mean}$ is an average distance computed between the selected observation vector and each landmark observation vector of the selected plurality of landmark observation vectors, $D(o, j)$ is the distance value computed between the selected observation vector o and the nearest landmark observation vector j, and $reg_p$ is a predefined regularization parameter.

26. The method of claim 20, further comprising:
reading, by the computing device, the second observation vector from the second dataset;
instantiating, by the computing device, a classification model from the stored, trained machine learning model;
computing, by the computing device, a predicted characteristic of the read second observation vector using the instantiated classification model; and
outputting, by the computing device, the computed predicted characteristic of the read second observation vector.

27. The method of claim 26, wherein before computing the predicted characteristic of the read second observation vector, an additional feature is computed for the read second observation vector using the computed plurality of principal components.

28. The method of claim 20, wherein computing the plurality of principal components comprises:
computing a covariance matrix from the selected plurality of neighbor observation vectors;
computing eigenvalues and eigenvectors from the computed covariance matrix; and
selecting a plurality of eigenvectors required to reach a predefined variance value, wherein the plurality of eigenvectors is the plurality of principal components.

29. The method of claim 20, further comprising, after (c) and before (d), normalizing, by the computing device, the selected plurality of neighbor observation vectors so that each dimension of each neighbor observation vector of the selected plurality of neighbor observation vectors has a value between zero and one based on a maximum value and a minimum value of the selected plurality of neighbor observation vectors in each dimension, wherein the normalized neighbor observation vectors are the selected plurality of neighbor observation vectors in (d).

30. The method of claim 29, further comprising, after (c) and before (d), normalizing, by the computing device, the plurality of observation vectors with respect to a neighborhood's subspace defined from the normalized selected plurality of neighbor observation vectors, wherein the normalized plurality of observation vectors are the plurality of observation vectors projected in (e).

* * * * *

UNITED STATES PATENT AND TRADEMARK OFFICE
CERTIFICATE OF CORRECTION

PATENT NO. : 10,565,528 B2
APPLICATION NO. : 16/221937
DATED : February 18, 2020
INVENTOR(S) : Namita Dilip Lokare et al.

It is certified that error appears in the above-identified patent and that said Letters Patent is hereby corrected as shown below:

In the Specification

Column 1, Lines 8-13:
Delete the phrase "The present application claims the benefit of 35 U.S.C. § 111(e) to U.S. Provisional Patent Application No. 62/628,662 filed on Feb. 9, 2018, and to U.S. Provisional Patent Application No. 62/633,938 filed on Feb. 22, 2018, the entire contents of which are hereby incorporated by reference." and replace with --The present application claims the benefit of 35 U.S.C. § 119(e) to U.S. Provisional Patent Application No. 62/628,662 filed on Feb. 9, 2018, and to U.S. Provisional Patent Application No. 62/633,938 filed on Feb. 22, 2018, the entire contents of which are hereby incorporated by reference.--.

Column 12, Lines 53-54:
Delete the phrase "$\Sigma = X^T X$ as $Cov(Y) = U^T \rho U$," and replace with --$\Sigma = X^T X$ as $Cov(Y) = U^T \Sigma U$,--.

Column 13, Line 51:
Delete the phrase "$D_{mean} = (\sum_{i=1}^{N_l} D(o,i))/N_l$." and replace with --$D_{mean} = (\sum_{i=1}^{N_l} D(o,i))/N_l$--.

Column 21, Lines 17-18:
Delete the phrase "$D_{mean} = (\sum_{i=1}^{N_l} D(o,i))/N_l$." and replace with --$D_{mean} = (\sum_{i=1}^{N_l} D(o,i))/N_l$--.

Column 22, Lines 66-67:
Delete the phrase "$D_{mean} = (\sum_{i=1}^{N_l} D(o,i))/N_l$." and replace with --$D_{mean} = (\sum_{i=1}^{N_l} D(o,i))/N_l$--.

Signed and Sealed this
Twenty-sixth Day of May, 2020

Andrei Iancu
*Director of the United States Patent and Trademark Office*

Column 27, Lines 7-8:
Delete the phrase "neighbor distance value E" and replace with --neighbor distance value $\varepsilon$--.